United States Patent
Song et al.

(10) Patent No.: US 11,670,761 B1
(45) Date of Patent: Jun. 6, 2023

(54) NEGATIVE ELECTRODE SHEET AND MANUFACTURING METHOD THEREOF AND BATTERY

(71) Applicants: Shenzhen Hairun New Energy Technology Co., Ltd., Guangdong (CN); Xiamen Hithium Energy Storage Technology Co., Ltd., Fujian (CN)

(72) Inventors: Qingqing Song, Guangdong (CN); Long Zhang, Guangdong (CN); Yinghui Xu, Guangdong (CN); Junwen Zhang, Guangdong (CN); Xin Lin, Guangdong (CN); Daohan Cai, Guangdong (CN)

(73) Assignees: Shenzhen Hairun New Energy Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/111,735

(22) Filed: Feb. 20, 2023

(30) Foreign Application Priority Data

Sep. 13, 2022 (CN) .......................... 202211107279.4

(51) Int. Cl.
*H01M 4/36* (2006.01)
*H01M 4/62* (2006.01)
(Continued)

(52) U.S. Cl.
CPC ......... *H01M 4/366* (2013.01); *H01M 4/0402* (2013.01); *H01M 4/48* (2013.01);
(Continued)

(58) Field of Classification Search
None
See application file for complete search history.

(56) References Cited

FOREIGN PATENT DOCUMENTS

| CN | 104817120 A | 8/2015 |
|---|---|---|
| CN | 107887572 A | 4/2018 |

(Continued)

OTHER PUBLICATIONS

Zhu, Yade, et al., "Novel carbon coated core-shell heterostructure NiCo2O4@NiO grown on carbon cloth as flexible lithium-ion battery anodes," Ceramics International, Aug. 23, 2018, 9 pages.

(Continued)

*Primary Examiner* — Carlos Barcena
(74) *Attorney, Agent, or Firm* — IP Spring

(57) ABSTRACT

A negative electrode sheet and a manufacturing method thereof and a battery are provided in the disclosure. The negative electrode sheet includes a conductive fiber cloth, a support layer, and an active material layer. The conductive fiber cloth serves as a current collector of the negative electrode sheet. The support layer is formed on a surface of the conductive fiber cloth and includes multiple protruding units, where each of the multiple protruding units includes multiple needle-shaped protrusions, and the multiple needle-shaped protrusions of each protruding unit are arranged radially. The active material layer includes multiple active portions, where each of the multiple active portions is formed on a surface of one of the multiple needle-shaped protrusions, and different active portions are formed on surfaces of different needle-shaped protrusions.

20 Claims, 17 Drawing Sheets

(51) Int. Cl.
  *H01M 4/48* (2010.01)
  *H01M 4/04* (2006.01)
  *H01M 4/02* (2006.01)

(52) U.S. Cl.
  CPC ...... *H01M 4/625* (2013.01); *H01M 2004/021* (2013.01); *H01M 2004/027* (2013.01)

(56) References Cited

FOREIGN PATENT DOCUMENTS

| | | |
|---|---|---|
| CN | 108520945 A | 9/2018 |
| CN | 108777302 A | 11/2018 |
| CN | 109768224 A | 5/2019 |
| CN | 112708906 A | 4/2021 |
| CN | 113930782 A | 1/2022 |
| JP | 20051355 A | 5/2005 |

OTHER PUBLICATIONS

Chen, Shouhui, et al., "Controllable growth of NiCo2O4 nanoarrays on carbon fiber cloth and its anodic performance for lithium-ion batteries," RSC Advances, Nov. 25, 2015, 8 pages.

Yang, Wanlu, et al., "Hierarchical NiCo2O4@NiO core-shell heterostructured nanowire arrays on carbon cloth for a high-performance flexible all-solid-state electrochemical capacitor," Journal of Materials Chemistry A, Nov. 11, 2013, 10 pages.

CNIPA, First Office Action corresponding Chinese Patent Application No. 202211107279 4, dated Oct. 26, 2022, 27 pages.

CNIPA, Notice of Allowance for corresponding Chinese Patent Application No. 202211107279.4, dated Nov. 16, 2022, 3 pages.

NEGATIVE ELECTRODE SHEET AND MANUFACTURING METHOD THEREOF AND BATTERY

CROSS-REFERENCE TO RELATED APPLICATION(S)

This application claims priority under 35 U.S.C. § 119(a) to and the benefit of Chinese Patent Application No. 202211107279.4, filed Sep. 13, 2022, the entire disclosure of which is incorporated herein by reference.

TECHNICAL FIELD

This disclosure relates to the field of electronic technology, and in particular, to a negative electrode sheet and a manufacturing method thereof and a battery.

BACKGROUND

At present, electrode materials of lithium-ion batteries generally include carbon-based materials, silicon-based materials, and transition metal oxides, the electrode materials are mixed with conductive agents and bonding agents to form slurries, and the slurries are coated on current collectors. During repeated charging and discharging of a lithium-ion battery, since active materials on a surface of a current collector may repeatedly expand and contract during embedding/de-embedding of lithium ions, internal stress is generated due to intermolecular or interatomic extrusion of the active materials during expansion, which easily causes the active materials to shatter and be detached from the current collector, thereby shortening a service life of the lithium-ion battery.

SUMMARY

A negative electrode sheet is provided in implementations of the disclosure. The negative electrode sheet includes a conductive fiber cloth, a support layer, and an active material layer. The conductive fiber cloth serves as a current collector of the negative electrode sheet. The support layer is formed on a surface of the conductive fiber cloth and includes multiple protruding units, where each of the multiple protruding units includes multiple needle-shaped protrusions, the multiple needle-shaped protrusions of each protruding unit are arranged radially, and the support layer is made of basic cobalt nickel carbonate ($NiCo(CO_3)_{0.5}OH$). The active material layer includes multiple active portions, where each of the multiple active portions is formed on a surface of one of the multiple needle-shaped protrusions, different active portions are formed on surfaces of different needle-shaped protrusions, and a multiple portions corresponding to each protruding unit are arranged radially. Each of the multiple active portions comprises a multiple active sub-layers, the multiple active sub-layers of each active portion are arranged sequentially in an extension direction of a needle-shaped protrusion, each of the multiple active sub-layers comprises a multiple active pieces, the multiple active pieces of each active sub-layer are arranged sequentially around a periphery of a needle-shaped protrusion, and each of the multiple active portions is made of antimony trioxide ($Sb_2O_3$).

A manufacturing method of a negative electrode sheet is further provided in implementations of the disclosure. The method includes the following. A conductive fiber cloth is provided. A support layer is formed on a surface of the conductive fiber cloth, where the support layer includes multiple protruding units, each of the multiple protruding units includes multiple needle-shaped protrusions, the multiple needle-shaped protrusions of each protruding unit are arranged radially, and the support layer is made of basic cobalt nickel carbonate ($NiCo(CO_3)_{0.5}OH$). An active material layer is formed on a surface of each of the multiple needle-shaped protrusions, where the active material layer comprises a multiple active portions, each of the multiple active portions is formed on a surface of one of the multiple needle-shaped protrusions, different active portions are formed on surfaces of different needle-shaped protrusions, and a multiple portions corresponding to each protruding unit are arranged radially. Each of the multiple active portions comprises a multiple active sub-layers, the multiple active sub-layers of each active portion are arranged sequentially in an extension direction of a needle-shaped protrusion, each of the multiple active sub-layers comprises a multiple active pieces, the multiple active pieces of each active sub-layer are arranged sequentially around a periphery of a needle-shaped protrusion, and each of the multiple active portions is made of antimony trioxide ($Sb_2O_3$).

A battery is further provided in implementations of the disclosure. The battery includes an electrolyte, a positive electrode sheet, a separator, and the negative electrode sheet in implementations of the disclosure. The positive electrode sheet is immersed in the electrolyte. The separator is located at one side of the positive electrode sheet and immersed in the electrolyte. The negative electrode sheet is disposed at one side of the separator away from the positive electrode sheet.

BRIEF DESCRIPTION OF THE DRAWINGS

In order to describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skill in the art can also obtain other drawings without creative effort.

Figure 1:
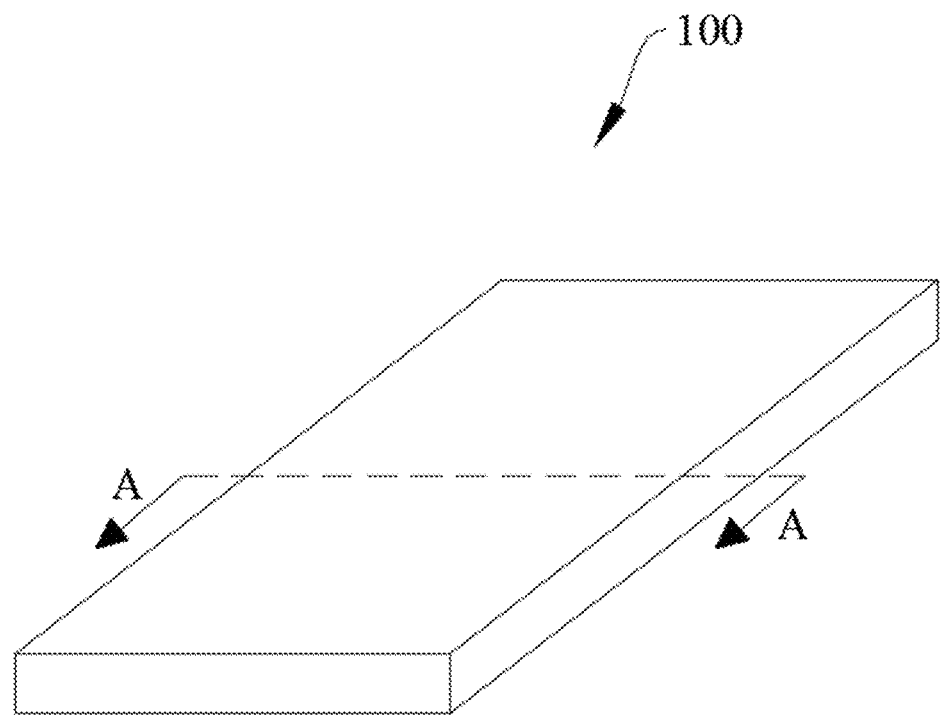
FIG. 1 is a schematic structural diagram illustrating a negative electrode sheet in an implementation of the disclosure.

Description of reference signs of the accompanying drawings: 100—negative electrode sheet, 10—conductive fiber cloth, 30—support layer, 31—protruding unit, 311—needle-shaped protrusion, 50—active material layer, 50a—active portion, 51—active sub-layer, 511—active piece, 70—cladding layer, 500—battery, 510—electrolyte, 530—positive electrode sheet, 550—separator, 520—housing, 540—negative electrode cover, 560—positive electrode cover, 600—electricity consumption device, 610—body of an electricity consumption device.

DETAILED DESCRIPTION

In order to facilitate better understanding of solution of the disclosure by those of ordinary skill in the art, the following will illustrate clearly and completely technical solutions of implementations of the disclosure with reference to accompanying drawings of implementations of the disclosure. Apparently, implementations illustrated herein are merely some, rather than all, of the disclosure. Based on the implementations of the disclosure, all other implementations obtained by those of ordinary skill in the art without creative effort shall fall within the protection scope of the disclosure.

The terms "include", "comprise", and "have" as well as any variations used in a specification, claims, and the accompany drawings of the disclosure are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The following will illustrate technical solutions in implementations of the disclosure with reference to the accompanying drawings.

It needs to be noted that, for convenience of illustration, the same reference sign of the accompanying drawings represents the same component in implementations of the disclosure, and for sake of simplicity, detailed illustration of the same component is omitted in different implementations.

At present, electrode materials of lithium-ion batteries generally include carbon-based materials, silicon-based materials, and transition metal oxides, the electrode materials are mixed with conductive agents and bonding agents to form slurries, and the slurries are coated on current collectors. During repeated charging and discharging of a lithium-ion battery, since active materials on a surface of a current collector may repeatedly expand and contract during embedding/de-embedding of lithium ions, intermolecular or interatomic extrusion of the active materials during expansion easily causes the active materials to shatter and be detached from the current collector, thereby shortening a service life of the lithium-ion battery.

In addition, in a lithium-ion battery, antimony can react with lithium in a completely reversible manner and has a relatively high reversible specific capacity. However, a volume of antimony changes considerably during reaction, which easily causes damage to electrode materials, thereby causing an extremely poor electrical-cycling-performance.

For problems mentioned above, a negative electrode sheet is provided in implementations of the disclosure. In the negative electrode sheet, an active material layer has a larger a specific surface area (SSA) and a better an electrochemical performance, and a conductive fiber cloth serves as a current collector, so that the negative electrode sheet has a better bending performance.

A negative electrode sheet is provided in implementations of the disclosure. The negative electrode sheet includes a conductive fiber cloth, a support layer, and an active material layer. The conductive fiber cloth serves as a current collector of the negative electrode sheet. The support layer is formed on a surface of the conductive fiber cloth and includes multiple protruding units, where each of the multiple protruding units includes multiple needle-shaped protrusions, and the multiple needle-shaped protrusions of each protruding unit are arranged radially. The active material layer includes multiple active portions, where each of the multiple active portions is formed on a surface of one of the multiple needle-shaped protrusions, and different active portions are formed on surfaces of different needle-shaped protrusions.

According to the negative electrode sheet in implementations of the disclosure, the conductive fiber cloth serves as the current collector, the needle-shaped protrusions arranged radially are formed on the conductive fiber cloth, and the active material layer is formed on a surface of each needle-shaped protrusion. The needle-shaped protrusions have extremely strong anchor performances and thus have relatively strong bonding forces with the conductive fiber cloth. Compared to direct formation of the active material layer on the surface of the conductive fiber cloth, the needle-shaped protrusions arranged radially are formed first on the surface of the conductive fiber cloth, and then the active material layer is formed on the surface of each needle-shaped protrusion, so that a transmission path of an ion can be shortened when the negative electrode sheet is applied to a battery. The needle-shaped protrusions can make the active material layer have a larger SSA, which can increase an effective contact area between active materials and an electrolyte, thereby effectively improving an electrochemical performance of the active material layer, e.g., a charging and discharging speed. Furthermore, the needle-shaped protrusions are arranged radially, and thus the active material layer on adjacent needle-shaped protrusions has a wider space, so that during charging and discharging, collapse or pulverization of the active material layer caused by expansion of the active material layer can be better avoided, the active material layer can more firmly adhere to the needle-shaped protrusions, the negative electrode sheet can have a better cycling performance, and a service life of the battery can be better lengthened when the negative electrode sheet is applied to the battery. Moreover, the conductive fiber cloth serves as the current collector, thereby making the negative electrode sheet have a better flexibility and effectively improving a bending performance and other mechanical performances of the negative electrode sheet.

Furthermore, each of the multiple active portions includes multiple active sub-layers, the multiple active sub-layers of each active portion are arranged sequentially in an extension direction of a needle-shaped protrusion, each of the multiple active sub-layers includes multiple active pieces, and the multiple active pieces of each active sub-layer are arranged sequentially around a periphery of a needle-shaped protrusion. Multiple active pieces are arranged around the periphery of the needle-shaped protrusion and sequentially in the extension direction of the needle-shaped protrusion, which can further increase the SSA of the active material layer, so that the negative electrode sheet has a larger contact area with an electrolyte when the negative electrode sheet is applied to the battery, thereby improving charging and discharging efficiency of the battery.

Furthermore, each of the multiple needle-shaped protrusions has a maximum radial dimension ranging from 100 nm to 200 nm. A too large maximum radial dimension d of each needle-shaped protrusion may lead to reduction of an SSA of each protruding unit, causing that active materials adhering to the surface of each needle-shaped protrusion are reduced, and thus reducing a specific capacity of negative-electrode active materials. A too small maximum radial dimension d of each needle-shaped protrusion may affect a length of each needle-shaped protrusion, making each needle-shaped protrusion not grown so long, and also lead to reduction of the SSA of each protruding unit, causing that the active materials adhering to the surface of each needle-shaped protrusion are reduced, and thus reducing the specific capacity of the negative-electrode active materials, which in addition decreases support stability of each needle-shaped protrusion.

Furthermore, each of the multiple needle-shaped protrusions has a length ranging from 1 μm to 5 μm. A too short length h of each needle-shaped protrusion causes a too small SSA of each protruding unit, so that less active materials adhere to the surface of each needle-shaped protrusion, and thus the specific capacity of the negative-electrode active materials is reduced. A too long length h of each needle-shaped protrusion causes that more active materials adhere to the surface of each needle-shaped protrusion, but the active materials have unstable structures and are easy to be detached, which may weaken the cycling performance of the negative electrode sheet and greatly increase manufacturing difficulty.

Furthermore, each of the multiple active pieces has a thickness ranging from 500 nm to 900 nm. Each active piece is not suitable to be too thick. If each active piece is too thick, during charging and discharging, active materials are stacked together during expansion of the active materials, the active materials are prone to mutual extrusion to cause collapse, and internal stress is easily generated within the active materials during expansion and contract, causing pulverization or collapse of the active pieces. If each active piece is too thin, an amount of active materials is too small, reducing the specific capacity of the negative-electrode active materials.

Furthermore, the conductive fiber cloth includes a carbon fiber cloth, the support layer is made of basic cobalt nickel carbonate ($NiCo(CO_3)_{0.5}OH$), and each of the multiple active portions is made of antimony trioxide ($Sb_2O_3$). $Sb_2O_3$ has a relatively high specific capacity, and antimony can react with lithium in a completely reversible manner and has a relatively high reversible specific capacity. However, a volume of antimony changes considerably during reaction, which easily causes damage to electrode materials, thereby causing an extremely poor electrical-cycling-performance. The needle-shaped protrusions are formed first on the surface of the conductive fiber cloth, and then $Sb_2O_3$ is grown on the surface of each needle-shaped protrusion, so that the active material layer on adjacent needle-shaped protrusions has a wider space, during charging and discharging, collapse or pulverization of the active material layer caused by expansion of the active material layer can be better avoided, the active material layer can better adhere to the needle-shaped protrusions, the negative electrode sheet can have a better cycling performance, and the service life of the battery can be better lengthened when the negative electrode sheet is applied to the battery.

Furthermore, the negative electrode sheet further includes a cladding layer formed on a surface of the active material layer away from the conductive fiber cloth. The cladding layer is formed on the surface of the active material layer away from the conductive fiber cloth, so that the active material layer can better adhere to the surface of the conductive fiber cloth, and thus collapse or pulverization of the active material layer during charging and discharging can be better avoided, thereby improving the cycling performance of the negative electrode sheet.

Furthermore, the material of the cladding layer is selected from a group consisting of polyvinylpyrrolidone, polyvinylidene fluoride, phenolic resin, epoxy resin, urea, asphalt, and coal tar. The cladding layer may not weaken the bending performance of the negative electrode sheet because of these materials, and in addition movement of ions between the active material layer and the electrolyte may also not be affected.

A manufacturing method of a negative electrode sheet is further provided in implementations of the disclosure. The method includes the following. A conductive fiber cloth is provided. A support layer is formed on a surface of the conductive fiber cloth, where the support layer includes multiple protruding units, each of the multiple protruding units includes multiple needle-shaped protrusions, and the multiple needle-shaped protrusions of each protruding unit are arranged radially. An active material layer is formed on a surface of each of the multiple needle-shaped protrusions.

According to the negative electrode sheet manufactured with the manufacturing method of the negative electrode sheet in implementations of the disclosure, the conductive fiber cloth serves as the current collector, the needle-shaped protrusions arranged radially are formed on the conductive fiber cloth, and the active material layer is formed on a surface of each needle-shaped protrusion. The needle-shaped protrusions have extremely strong anchor performances and thus have relatively strong bonding forces with the conductive fiber cloth. Compared to direct formation of the active material layer on the surface of the conductive fiber cloth, the needle-shaped protrusions arranged radially are formed first on the surface of the conductive fiber cloth, and then the active material layer is formed on the surface of each needle-shaped protrusion, so that a transmission path of an ion can be shortened when the negative electrode sheet is applied to a battery. The needle-shaped protrusions can make the active material layer have a larger SSA, which can increase an effective contact area between active materials and an electrolyte, thereby effectively improving an electrochemical performance of the active material layer, e.g., a charging and discharging speed. Furthermore, the needle-shaped protrusions are arranged radially, and thus the active material layer on adjacent needle-shaped protrusions has a wider space, so that during charging and discharging, collapse or pulverization of the active material layer caused by expansion of the active material layer can be better avoided, the active material layer can better adhere to the needle-shaped protrusions, the negative electrode sheet can have a better cycling performance, and a service life of the battery can be better lengthened when the negative electrode sheet is applied to the battery. Moreover, the conductive fiber cloth serves as the current collector, thereby making the negative electrode sheet have a better flexibility and effectively improving a bending performance and other mechanical performances of the negative electrode sheet.

Furthermore, the active material layer is formed on the surface of each of the multiple needle-shaped protrusions as follows. The active material layer is formed on the surface of each of the multiple needle-shaped protrusions by a reactant of an active material reacting with a substance on the surface of each of the multiple needle-shaped protrusions in a vapor of the reactant of the active material. As such, each protruding unit where the multiple needle-shaped protrusions are arranged radially can be better formed.

Furthermore, the support layer is formed on the surface of the conductive fiber cloth as follows, where the support layer includes the multiple protruding units, each of the multiple protruding units includes the multiple needle-shaped protrusions, and the multiple needle-shaped protrusions of said each protruding unit are arranged radially. A mixture liquid of $NiCl_2 \cdot 6H_2O$, $CoCl_2 \cdot 6H_2O$, and urea is provided. The conductive fiber cloth is immersed in the mixture liquid. The support layer is formed on the surface of the conductive fiber cloth through reaction for a first duration under a first temperature, where the support layer includes the multiple protruding units, each of the multiple protruding units includes the multiple needle-shaped protrusions, the multiple needle-shaped protrusions of said each protruding unit are arranged radially, and each of the multiple needle-shaped protrusions is made of $NiCo(CO_3)_{0.5}OH$. As such, it is conducive to forming each protruding unit where the multiple needle-shaped protrusions are arranged radially.

Furthermore, a mole ratio of $NiCl_2 \cdot 6H_2O$, $CoCl_2 \cdot 6H_2O$, and urea in the mixture liquid ranges from 1:2:4 to 1:2:8, the first temperature ranges from 80° C. to 200° C., and the first duration ranges from 5 h to 15 h. A content of urea in the mixture liquid is not suitable to be too high, otherwise distribution of the needle-shaped protrusions of each protruding unit may be affected. If the content of urea in the mixture liquid is too high (for example, the mole ratio of $NiCl_2 \cdot 6H_2O$, $CoCl_2 \cdot 6H_2O$, and urea is 1:2:12), the protruding units are grown not closely and distributed unevenly, and the needle-shaped protrusions adhere to one another and are poorly dispersed, which weaken an adhesion performance of the active material layer on the support layer and thus decrease a recycling performance of the negative electrode sheet. The first temperature is not suitable to be too high or too low. If the first temperature is too high or too low, formation of nano-level needle-shaped protrusions may be affected, even the nano-level needle-shaped protrusions may be unable to be formed. The first duration is not suitable to be too short. If the first duration for reaction is too short, the nano-level needle-shaped protrusions are unable to be formed, thereby affecting adhesion of the active material layer to the needle-shaped protrusions. If the first duration is too long, productive efficiency of the negative electrode sheet may be reduced.

Furthermore, the active material layer is formed on the surface of each of the multiple needle-shaped protrusions by the reactant of the active material reacting with the substance on the surface of each of the multiple needle-shaped protrusions in the vapor of the reactant of the active material as follows. Under a second temperature ranging from 100° C. to 400° C., in a vapor of antimony trichloride ($SbCl_3$), a $Sb_2O_3$ layer is formed on the surface of each of the multiple needle-shaped protrusions by $SbCl_3$ reacting with $NiCo(CO_3)_{0.5}OH$ on the surface of each of the multiple needle-shaped protrusions for a second duration, where the second duration ranges from 1 h to 5 h, the reactant of the active material is $SbCl_3$, and the active material layer is the $Sb_2O_3$ layer. Crystals of $SbCl_3$ may sublimate under the second temperature to form a vapor of $SbCl_3$, the vapor of $SbCl_3$ crystallizes when contacting with the conductive fiber cloth with the support layer and reacts with $NiCo(CO_3)_{0.5}OH$ on the surface of each needle-shaped protrusion to form $Sb_2O_3$. When the second temperature is too low, an amount of $SbCl_3$ volatilized is too small, or the crystals of $SbCl_3$ cannot be volatilized to form the vapor of $SbCl_3$, so that $SbCl_3$ is hard to adhere to the surface of the conductive fiber cloth. When the second temperature is too high, water of crystallization of $NiCo(CO_3)_{0.5}OH$ easily evaporates, so that $NiCo(CO_3)_{0.5}OH$ is easily decomposed and thus a structure of each of the nano-level needle-shaped protrusions is destroyed. When the second duration is too short, $SbCl_3$ reacts with $NiCo(CO_3)_{0.5}OH$ incompletely to form less active materials of the active material layer. When the second duration is too long, energy is wasted, and productive efficiency is too low.

Furthermore, a weight ratio of $NiCl_2 \cdot 6H_2O$, $CoCl_2 \cdot 6H_2O$, and $SbCl_3$ ranges from 1:2:1.23 to 1:2:2.63. When a content of $SbCl_3$ is too excessive, redundant $SbCl_3$ may remain on a surface of $Sb_2O_3$, and an electrolyte becomes acidic when chloride ions are dissolved in the electrolyte, which may cause copper foil and aluminum foil of an electrode sheet (e.g., a positive electrode sheet) in a battery to be corroded and penetrated, thereby affecting a normal function of the battery.

Furthermore, after forming the active material layer on the surface of each of the multiple needle-shaped protrusions, the method further includes the following. An aqueous solution of a raw material component of a cladding layer is provided. The conductive fiber cloth with the support layer and the active material layer is immersed in the aqueous solution of the raw material component of the cladding layer. The cladding layer is formed on a surface of the active material layer away from the conductive fiber cloth by taking out the conductive fiber cloth for drying. The cladding layer is formed on the surface of the active material layer away from the conductive fiber cloth, so that the active material layer can better adhere to the surface of the conductive fiber cloth, and thus collapse or pulverization of the active material layer during charging and discharging can be better avoided, thereby improving the cycling performance of the negative electrode sheet.

A battery is further provided in implementations of the disclosure. The battery includes an electrolyte, a positive electrode sheet, a separator, and the negative electrode sheet in implementations of the disclosure. The positive electrode sheet is immersed in the electrolyte. The separator is located at one side of the positive electrode sheet and immersed in the electrolyte. The negative electrode sheet is disposed at one side of the separator away from the positive electrode sheet.

An electricity consumption device is further provided in implementations of the disclosure. The electricity consumption device includes a body of the electricity consumption device and the battery in implementations of the disclosure. The positive electrode sheet of the battery is configured to be electrically coupled with a positive electrode of the body of the electricity consumption device, the negative electrode sheet of the battery is configured to be electrically coupled with a negative electrode of the body of the electricity consumption device, and the battery is configured to supply power to the body of the electricity consumption device.

According to the negative electrode sheet in implementations of the disclosure, the conductive fiber cloth serves as the current collector, the needle-shaped protrusions arranged radially are formed on the conductive fiber cloth, and the active material layer is formed on a surface of each needle-shaped protrusion. The needle-shaped protrusions have extremely strong anchor performances and thus have relatively strong bonding forces with the conductive fiber cloth. Compared to direct formation of the active material layer on the surface of the conductive fiber cloth, the needle-shaped protrusions arranged radially are formed first on the surface of the conductive fiber cloth, and then the active material layer is formed on the surface of each needle-shaped protrusion, so that a transmission path of an ion can be shortened when the negative electrode sheet is applied to a battery. The needle-shaped protrusions can make the active material layer have a larger SSA, which can increase an effective contact area between active materials and an electrolyte, thereby effectively improving an electrochemical performance of the active material layer, e.g., a charging and discharging speed. Furthermore, the needle-shaped protrusions are arranged radially, and thus the active material layer on adjacent needle-shaped protrusions has a wider space, so that during charging and discharging, collapse or pulverization of the active material layer caused by expansion of the active material layer can be better avoided, the active material layer can more firmly adhere to the needle-shaped protrusions, the negative electrode sheet can have a better cycling performance, and a service life of the battery can be better lengthened when the negative electrode sheet is applied to the battery. Moreover, the conductive fiber cloth serves as the current collector, thereby making the negative electrode sheet have a better flexibility and effectively improving a bending performance and other mechanical performances of the negative electrode sheet.

Herein, a negative electrode sheet 100 is provided in implementations of the disclosure. The negative electrode sheet 100 can serve as a negative electrode sheet 100 of a battery, and an active material layer 50 of the negative electrode sheet 100 can better adhere to a surface of a current collector and thus the negative electrode sheet 100 has a better conductive cycling performance.

Figure 2:
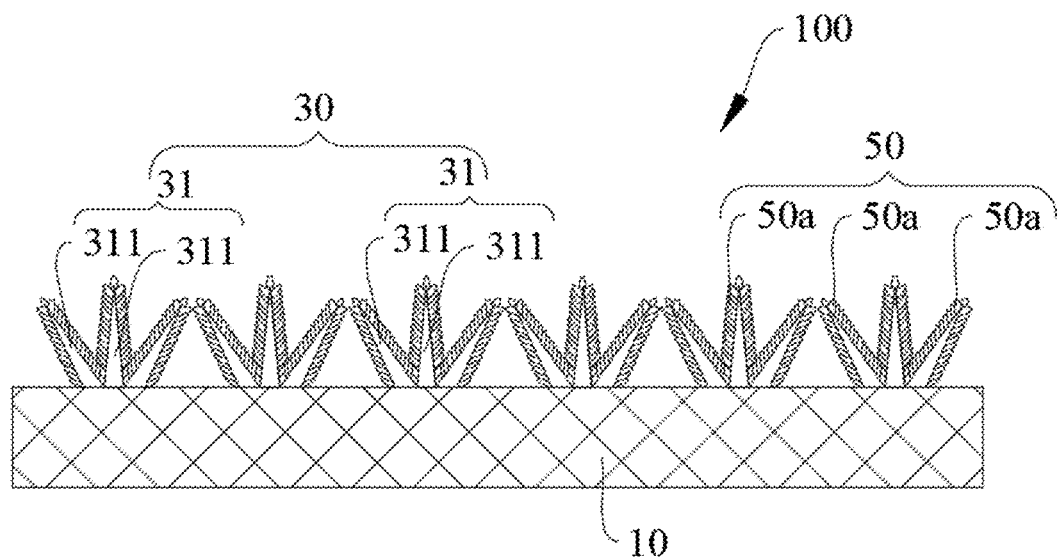
FIG. 2 is a schematic cross-sectional structural view of a negative electrode sheet in an implementation of the disclosure, taken in direction A-A illustrated in FIG. 1.

FIG. 1 is a schematic structural diagram illustrating a negative electrode sheet 100 in an implementation of the disclosure. FIG. 2 is a schematic cross-sectional structural view of a negative electrode sheet 100 in an implementation of the disclosure, taken in direction A-A illustrated in FIG. 1.

Referring to FIG. 1 and FIG. 2, the negative electrode sheet 100 is provided in implementations of the disclosure. The negative electrode sheet 100 includes a conductive fiber cloth 10, a support layer 30, and an active material layer 50. The conductive fiber cloth 10 serves as a current collector of the negative electrode sheet 100. The support layer 30 is formed on a surface of the conductive fiber cloth 10 and includes multiple protruding units 31, where each of the multiple protruding units 31 includes multiple needle-shaped protrusions 311, and multiple needle-shaped protrusions 311 of a protruding unit 31 are arranged radially. The active material layer 50 includes multiple active portions 50a, where each of the multiple active portions 50a is formed on a surface of one of the multiple needle-shaped protrusions 311, and different active portions 50a are formed on surfaces of different needle-shaped protrusions 311.

It needs to be noted that, the support layer 30 is formed on the surface of the conductive fiber cloth 10, and the support layer 30 may also be formed on one or more of all surfaces of the conductive fiber cloth 10, or part or all of one surface of the conductive fiber cloth 10. Optionally, the support layer 30 may be formed on all surfaces of the conductive fiber cloth 10, but part of at least one of the all surfaces is not covered by the support layer 30, so that the part can be coupled with a tab or serve as a tab and finally is electrically coupled with a conductive terminal on a cover plate of the battery.

Optionally, the multiple protruding units 31 are arranged closely on the surface of the conductive fiber cloth 10. Optionally, each active portion 50a is formed on the surface of each needle-shaped protrusion 311.

It can be understood that, the multiple active portions 50a may be arranged at intervals, and may also be connected with one another to form a whole active material layer 50 arranged consecutively.

It can be understood that, the active material layer 50 is deposited along the surface of each needle-shaped protrusion, so that the multiple active portions corresponding to each protruding unit are also arranged radially.

It can also be understood that, a surface of the active material layer 50 away from the conductive fiber cloth 10 is rough or uneven, to provide a wider space for expansion and contract of each active portion 50a.

Optionally, the conductive fiber cloth 10 may be, but is not limited to, a carbon fiber cloth, a woven cloth with a conductive material attached to a surface of a fiber thread, or other woven cloths with conductivity.

According to the negative electrode sheet 100 in implementations of the disclosure, the conductive fiber cloth 10 serves as the current collector, the needle-shaped protrusions 311 arranged radially are formed on the conductive fiber cloth 10, and the active material layer 50 is formed on a surface of each needle-shaped protrusion 311. The needle-shaped protrusions 311 have extremely strong anchor performances and thus have relatively strong bonding forces with the conductive fiber cloth 10. Compared to direct formation of the active material layer 50 on the surface of the conductive fiber cloth 10, the needle-shaped protrusions 311 arranged radially are formed first on the surface of the conductive fiber cloth 10, and then the active material layer 50 is formed on the surface of each needle-shaped protrusion 311, so that a transmission path of an ion can be shortened when the negative electrode sheet 100 is applied to a battery. The needle-shaped protrusions 311 can make the active material layer 50 have a larger specific surface area (SSA), which can increase an effective contact area between active materials and an electrolyte, thereby effectively improving an electrochemical performance of the active material layer 50, e.g., a charging and discharging speed. Furthermore, the needle-shaped protrusions 311 are arranged radially, and thus the active material layer 50 on adjacent needle-shaped protrusions 311 has a wider space, so that during charging and discharging, collapse or pulverization of the active material layer 50 caused by expansion of the active material layer 50 can be better avoided, the active material layer 50 can more firmly adhere to the needle-shaped protrusions 311, the negative electrode sheet 100 can have a better cycling performance (or a cycling stability), and a service life of the battery can be better lengthened when the negative electrode sheet 100 is applied to the battery. Moreover, the conductive fiber cloth 10 serves as a flexible electrode-material substrate and the current collector, thereby making the negative electrode sheet 100 have a better flexibility and effectively improving a bending performance and other mechanical performances of the negative electrode sheet 100.

Figure 3:
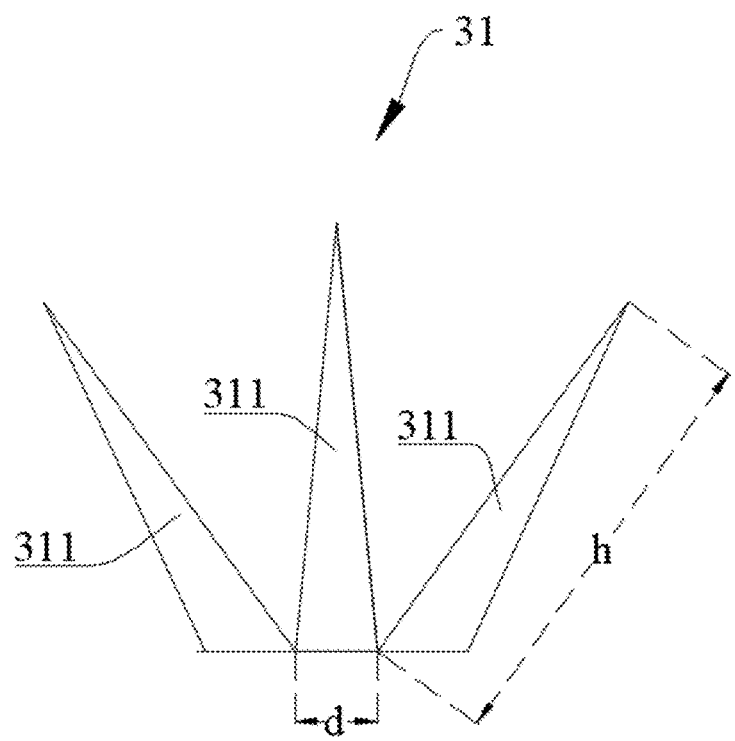
FIG. 3 is a schematic structural diagram illustrating a protruding unit in an implementation of the disclosure.

FIG. 3 is a schematic structural diagram illustrating a protruding unit 31 in an implementation of the disclosure. Referring to FIG. 3, in some implementations, each needle-shaped protrusion 311 has a maximum radial dimension d ranging from 100 nm to 200 nm. A too large maximum radial dimension d of each needle-shaped protrusion 311 may lead to reduction of an SSA of each protruding unit 31, causing that active materials adhering to the surface of each needle-shaped protrusion 311 are reduced, and thus reducing a specific capacity of negative-electrode active materials. A too small maximum radial dimension d of each needle-shaped protrusion 311 may affect a length of each needle-shaped protrusion 311, making each needle-shaped protrusion 311 is not grown so long, and also lead to reduction of the SSA of each protruding unit 31, causing that the active materials adhering to the surface of each needle-shaped protrusion 311 are reduced, and thus reducing the specific capacity of the negative-electrode active materials, which in addition decreases support stability of each needle-shaped protrusion 311.

In implementations of the disclosure, when a numeric range from a to b is involved, it is indicated that a value may be any value from a to b which may include the endpoint value a and the endpoint value b, if not specifically indicated.

Optionally, the maximum radial dimension d of each needle-shaped protrusion 311 may be, but is not limited to, 100 nm, 110 nm, 120 nm, 130 nm, 140 nm, 150 nm, 154 nm, 160 nm, 170 nm, 180 nm, 190 nm, 200 nm, etc.

In some implementations, each needle-shaped protrusion 311 has a length h ranging from 1 µm to 5 µm. A too short length h of each needle-shaped protrusion 311 causes a too small SSA of each protruding unit 31, so that less active materials adhere to the surface of each needle-shaped protrusion 311, and thus the specific capacity of the negative-electrode active materials is reduced. A too long length h of each needle-shaped protrusion 311 causes that more active materials adhere to the surface of each needle-shaped protrusion 311, but the active materials have unstable structures and are easy to be detached, which may weaken the cycling performance of the negative electrode sheet 100 and greatly increase manufacturing difficulty.

Optionally, the length h of each needle-shaped protrusion 311 may be, but is not limited to, 1 µm, 1.5 µm, 2 µm, 2.5 µm, 3 µm, 3.5 µm, 4 µm, 4.5 µm, 5 µm, etc.

In some implementations, the support layer 30 is made of basic cobalt nickel carbonate ($NiCo(CO_3)_{0.5}OH$). $NiCo(CO_3)_{0.5}OH$ can well adhere to the surface of the conductive fiber cloth 10 and the needle-shaped protrusions 311 arranged radially can be well formed.

Figure 4:
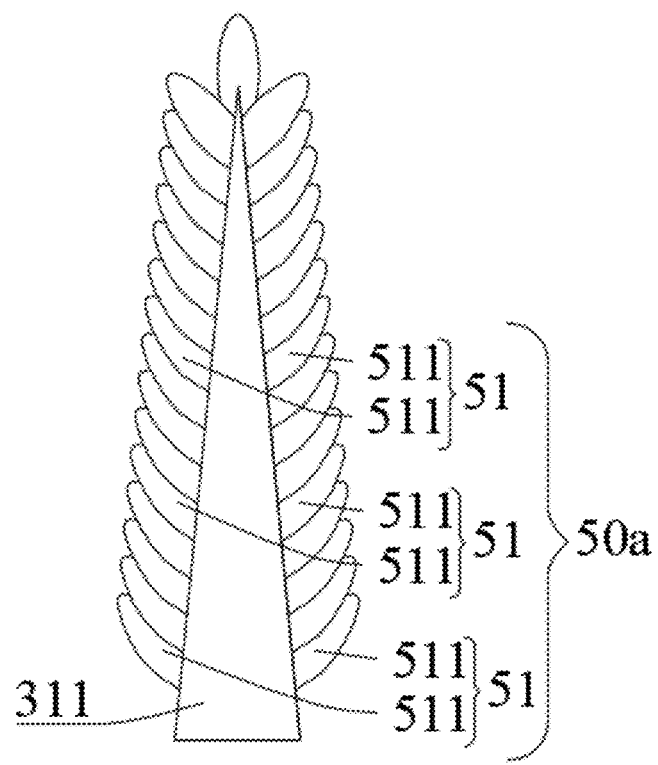
FIG. 4 is a schematic structural diagram illustrating a needle-shaped protrusion and an active portion in an implementation of the disclosure.

FIG. 4 is a schematic structural diagram illustrating a needle-shaped protrusion 311 and an active portion 50a in an implementation of the disclosure. Referring to FIG. 4, in some implementations, each of the multiple active portions 50a includes multiple active sub-layers 51, multiple active sub-layers 51 of an active portion 50a are arranged sequentially in an extension direction of a needle-shaped protrusion 311, each of the multiple active sub-layers 51 includes multiple active pieces 511, and multiple active pieces 511 of an active sub-layer 51 are arranged sequentially around a periphery of a needle-shaped protrusion 311. Multiple active pieces 511 are arranged around the periphery of the needle-shaped protrusion 311 and sequentially in the extension direction of the needle-shaped protrusion 311, which can further increase an SSA of the active portion 50a, so that the negative electrode sheet 100 has a larger contact area with an electrolyte when the negative electrode sheet 100 is applied to the battery, thereby improving charging and discharging efficiency of the battery.

It needs to be noted that, the active pieces 511 of each needle-shaped protrusion 311 are arranged around the periphery of the needle-shaped protrusion 311 and in the extension direction of the needle-shaped protrusion 311, thereby forming a structure similar to a "pine cone", multi-layered petals, or a flower cluster.

Optionally, each of the multiple active pieces 511 has a thickness ranging from 500 nm to 900 nm. Each active piece 511 is not suitable to be too thick. If each active piece 511 is too thick, during charging and discharging, active materials are stacked together during expansion of the active materials, the active materials are prone to mutual extrusion to cause collapse, and internal stress is easily generated within the active materials during expansion and contract, causing pulverization or collapse of the active pieces 511. If each active piece 511 is too thin, an amount of active materials is too small, reducing the specific capacity of the negative-electrode active materials.

Optionally, the thickness of each active piece 511 may be, but is not limited to, 500 nm, 550 nm, 600 nm, 650 nm, 670 nm, 700 nm, 750 nm, 800 nm, 850 nm, 900 nm, etc.

Optionally, each active portion 50a includes antimony trioxide ($Sb_2O_3$). $Sb_2O_3$ has a relatively high specific capacity, and antimony can react with lithium in a completely reversible manner and has a relatively high reversible specific capacity. However, a volume of antimony changes considerably during reaction, which easily causes damage to electrode materials, thereby causing an extremely poor electrical-cycling-performance. The needle-shaped protrusions 311 are formed first on the surface of the conductive fiber cloth 10, and then $Sb_2O_3$ is grown on the surface of each needle-shaped protrusion 311, so that the active material layer 50 on adjacent needle-shaped protrusions 311 has a wider space, and during charging and discharging, collapse or pulverization of the active material layer 50 caused by expansion of the active material layer 50 can be better avoided, the active material layer 50 can better adhere to the needle-shaped protrusions 311, the negative electrode sheet 100 can have a better cycling performance, and the service life of the battery can be better lengthened when the negative electrode sheet 100 is applied to the battery.

Figure 5:
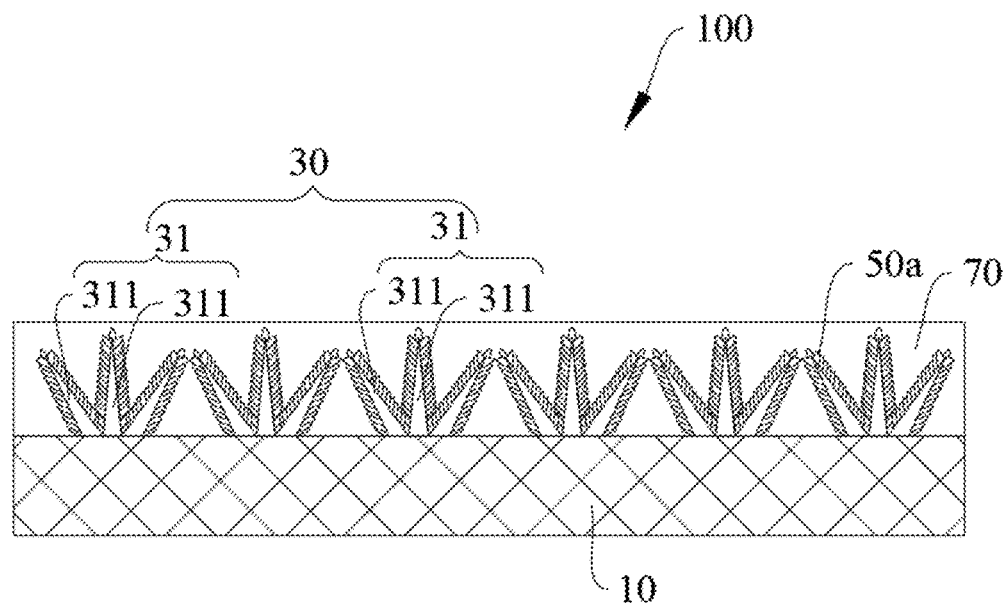
FIG. 5 is a schematic cross-sectional structural view of a negative electrode sheet in another implementation of the disclosure, taken in direction A-A illustrated in FIG. 1.

FIG. 5 is a schematic cross-sectional structural view of a negative electrode sheet 100 in another implementation of the disclosure, taken in direction A-A illustrated in FIG. 1. Referring to FIG. 5, in some implementations, the negative electrode sheet 100 further includes a cladding layer 70 formed on a surface of the active material layer 50 away from the conductive fiber cloth 10. The cladding layer 70 is formed on the surface of the active material layer 50 away from the conductive fiber cloth 70, so that the active material layer 50 can better adhere to the surface of the conductive fiber cloth 10, and thus collapse or pulverization of the active material layer 50 during charging and discharging can be better avoided, thereby improving the cycling performance of the negative electrode sheet 100.

Optionally, the cladding layer 70 may be a water-soluble and flexible polymer, so that the cladding layer 70 may not weaken the bending performance of the negative electrode sheet 100, and in addition movement of ions between the active material layer 50 and the electrolyte may also not be affected.

Optionally, the material of the cladding layer 70 is selected from a group consisting of polyvinylpyrrolidone, polyvinylidene fluoride, phenolic resin, epoxy resin, urea, asphalt, and coal tar. The cladding layer 70 may not weaken the bending performance of the negative electrode sheet 100 because of these materials, and in addition movement of ions between the active material layer 50 and the electrolyte may also not be affected.

In some implementations, the cladding layer 70 is made of polyvinyl pyrrolidone (PVP) and polyvinylidene fluoride (PVDF). Optionally, a weight ratio of PVP to PVDF may range from 7:3 to 9:1 and specifically may be, but is not limited to, 7:3, 7.5:2.5, 8:2, 8.5:1.5, 9:1, etc.

The negative electrode sheet 100 in implementations of the disclosure may be manufactured with a method illustrated in the following implementations of the disclosure, and in addition may also be manufactured with other methods, where the manufacturing method in implementations of the disclosure is merely one or more types of manufacturing methods of the negative electrode sheet 100 in the disclosure and may not be understood as limitation to the negative electrode sheet 100 provided in implementations of the disclosure. The manufacturing method of the negative electrode sheet 100 in the disclosure is also not limited to manufacturing the negative electrode sheet 100 in the disclosure and may also not be understood as limitation to the manufacturing method of the negative electrode sheet 100 provided in implementations of the disclosure.

Figure 6:
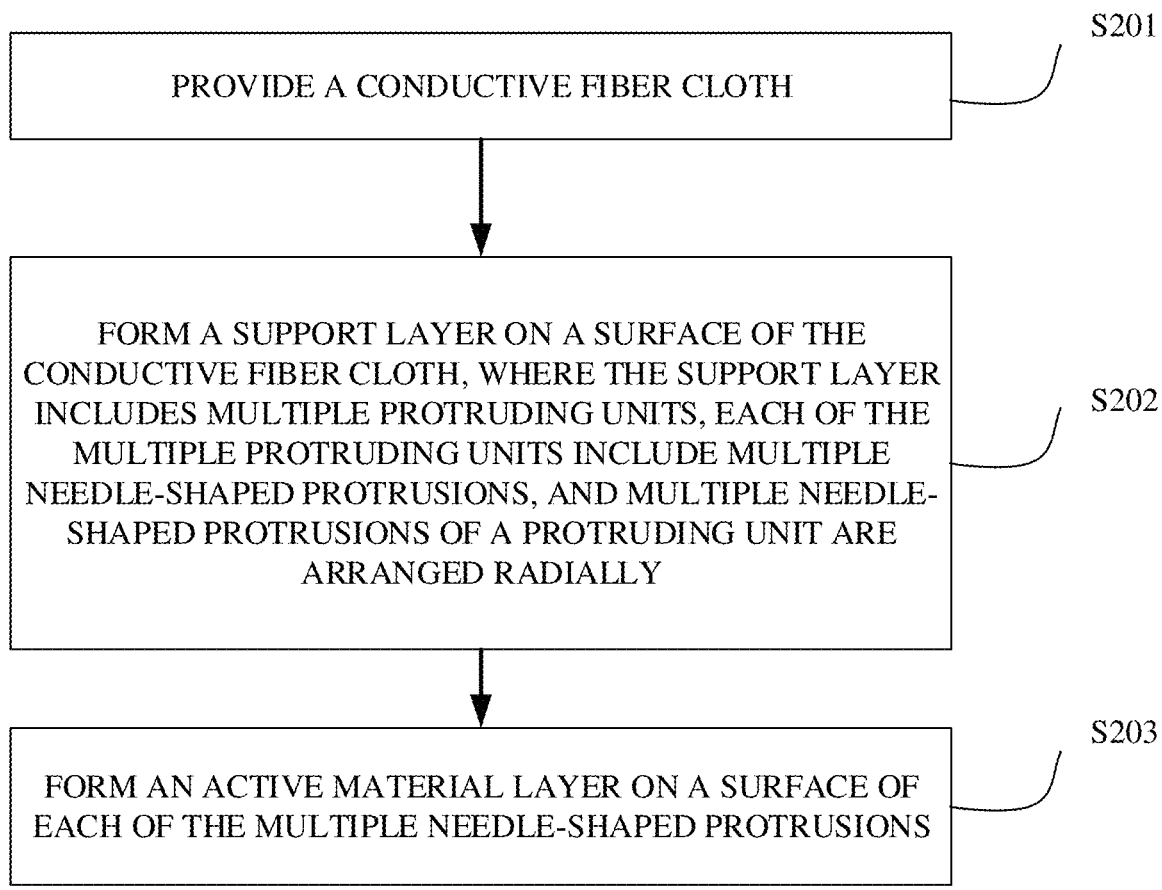
FIG. 6 is a schematic flow chart illustrating a manufacturing method of a negative electrode sheet in an implementation of the disclosure.

FIG. 6 is a schematic flow chart illustrating a manufacturing method of a negative electrode sheet 100 in an implementation of the disclosure. Referring to FIG. 6, the manufacturing method of the negative electrode sheet 100 is provided in implementations of the disclosure and includes the following.

S201, a conductive fiber cloth 10 is provided.

Optionally, the conductive fiber cloth 10 may be, but is not limited to, a carbon fiber cloth, a woven cloth with a conductive material attached to a surface of a fiber thread, or other woven cloths with conductivity.

S202, a support layer 30 is formed on a surface of the conductive fiber cloth 10, where the support layer 30 includes multiple protruding units 31, each of the multiple protruding units 31 includes multiple needle-shaped protrusions 311, and multiple needle-shaped protrusions 311 of a protruding unit 31 are arranged radially.

S203, an active material layer 50 is formed on a surface of each of the multiple needle-shaped protrusions 311.

For detailed illustrations of the conductive fiber cloth 10, the support layer 30, and the active material layer 50, reference can be made to the illustrations of corresponding parts of the foregoing implementations, which are not repeated herein.

According to the negative electrode sheet 100 manufactured with the manufacturing method of the negative electrode sheet 100 in implementations of the disclosure, the conductive fiber cloth 10 serves as the current collector, the needle-shaped protrusions 311 arranged radially are formed on the conductive fiber cloth 10, and the active material layer 50 is formed on a surface of each needle-shaped protrusion 311. The needle-shaped protrusions 311 have extremely strong anchor performances and thus have relatively strong bonding forces with the conductive fiber cloth 10. Compared to direct formation of the active material layer 50 on the surface of the conductive fiber cloth 10, the needle-shaped protrusions 311 arranged radially are formed first on the surface of the conductive fiber cloth 10, and then the active material layer 50 is formed on the surface of each needle-shaped protrusion 311, so that a transmission path of an ion can be shortened when the negative electrode sheet 100 is applied to a battery. The needle-shaped protrusions 311 can make the active material layer 50 have a larger SSA, which can increase an effective contact area between active materials and an electrolyte, thereby effectively improving an electrochemical performance of the active material layer 50, e.g., a charging and discharging speed. Furthermore, the needle-shaped protrusions 311 are arranged radially, and thus the active material layer 50 on adjacent needle-shaped protrusions 311 has a wider space, so that during charging and discharging, collapse or pulverization of the active material layer 50 caused by expansion of the active material layer 50 can be better avoided, the active material layer 50 can better adhere to the needle-shaped protrusions 311, the negative electrode sheet 100 can have a better cycling performance, and a service life of the battery can be better lengthened when the negative electrode sheet 100 is applied to the battery. Moreover, the conductive fiber cloth 10 serves as the current collector, thereby making the negative electrode sheet 100 have a better flexibility and effectively improving a bending performance and other mechanical performances of the negative electrode sheet 100.

Figure 7:
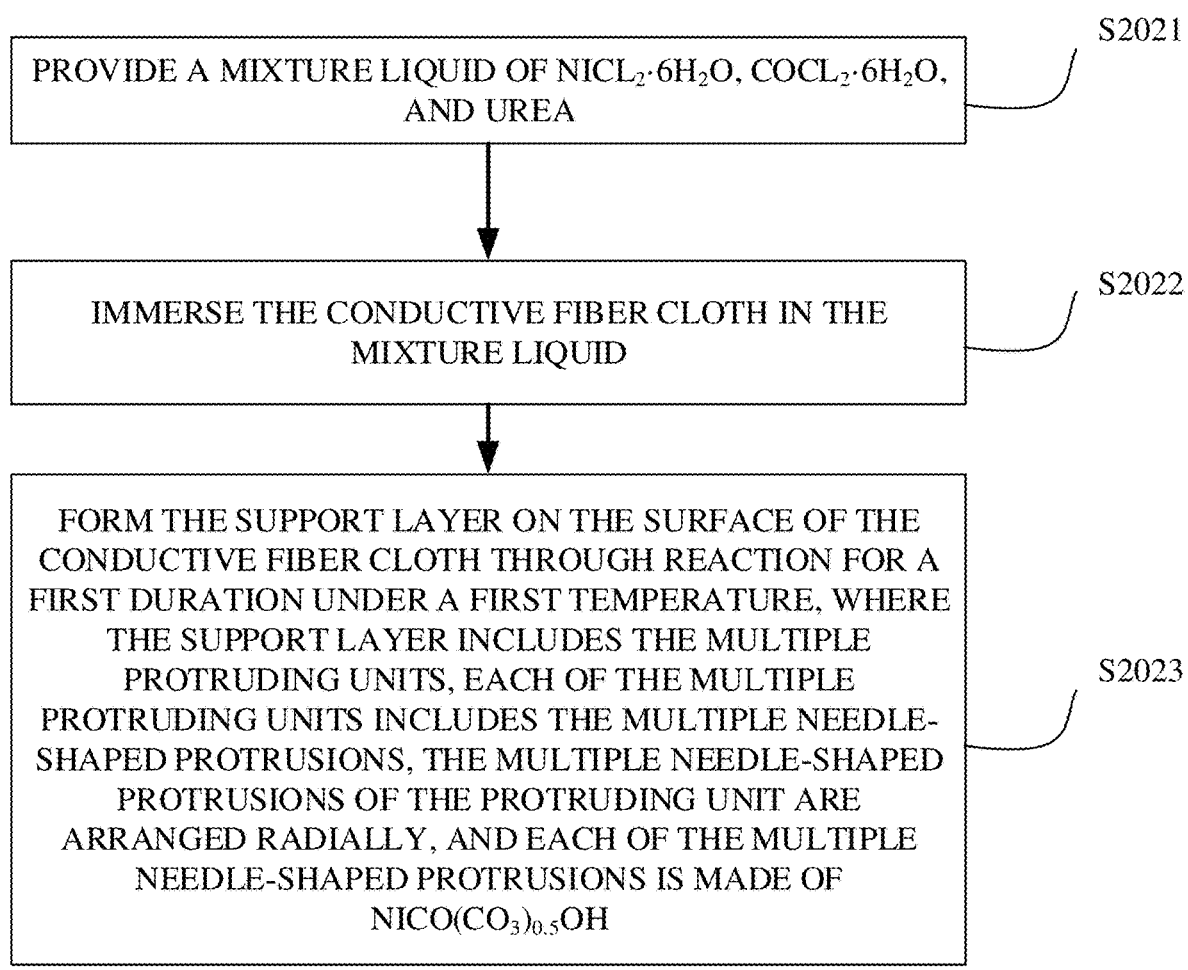
FIG. 7 is a schematic flow chart illustrating a manufacturing method of a support layer in an implementation of the disclosure.

FIG. 7 is a schematic flow chart illustrating a manufacturing method of a support layer 30 in an implementation of the disclosure. Referring to FIG. 7, the support layer 30 is formed on the surface of the conductive fiber cloth 10 as follows, where the support layer 30 includes the multiple protruding units 31, each of the multiple protruding units 31 includes the multiple needle-shaped protrusions 311, and the multiple needle-shaped protrusions 311 of the protruding unit 31 are arranged radially.

S2021, a mixture liquid of $NiCl_2 \cdot 6H_2O$, $CoCl_2 \cdot 6H_2O$, and urea is provided.

Optionally, $NiCl_2 \cdot 6H_2O$, $CoCl_2 \cdot 6H_2O$, and urea are weighed according to a preset ratio, and $NiCl_2 \cdot 6H_2O$, $CoCl_2 \cdot 6H_2O$, and urea are added to water and stirred for 30 min to dissolve in water, to obtain the mixture liquid of $NiCl_2 \cdot 6H_2O$, $CoCl_2 \cdot 6H_2O$, and urea with a preset concentration.

Optionally, a mole ratio of $NiCl_2 \cdot 6H_2O$, $CoCl_2 \cdot 6H_2O$, and urea in the mixture liquid ranges from 1:2:4 to 1:2:8. Optionally, the mole ratio of $NiCl_2 \cdot 6H_2O$, $CoCl_2 \cdot 6H_2O$, and urea in the mixture liquid may be, but is not limited to, 1:2:4, 1:2:5, 1:2:5.5, 1:2:6, 1:2:6.5, 1:2:7, 1:2:8, etc. A content of urea in the mixture liquid is not suitable to be too high, otherwise distribution of the needle-shaped protrusions 311 of each protruding unit 31 may be affected. If the content of urea in the mixture liquid is too high (for example, the mole ratio of $NiCl_2 \cdot 6H_2O$, $CoCl_2 \cdot 6H_2O$, and urea is 1:2:12), the protruding units 31 are grown not closely and distributed unevenly, and the needle-shaped protrusions 311 adhere to one another and are poorly dispersed, which weaken an adhesion performance of the active material layer 50 on the support layer 30 and thus decrease a recycling performance of the negative electrode sheet 100.

In a specific implementation, in the mixture liquid, a mole concentration of $NiCl_2 \cdot 6H_2O$ is 0.06 mol/L, a mole concentration of $CoCl_2 \cdot 6H_2O$ is 0.12 mol/L, and a mole concentration of urea is 0.36 mol/L.

S2022, the conductive fiber cloth 10 is immersed in the mixture liquid.

Optionally, a preset amount (e.g., 40 ml) of the mixture liquid is weighed and poured into a polytetrafluoroethylene (PTFE) liner, the conductive fiber cloth 10 is immersed in the mixture liquid, and the PTFE liner is placed into a reaction kettle.

S2023, the support layer 30 is formed on the surface of the conductive fiber cloth 10 through reaction for a first duration under a first temperature, where the support layer 30 includes the multiple protruding units 31, each of the multiple protruding units 31 includes the multiple needle-shaped protrusions 311, the multiple needle-shaped protrusions 311 of the protruding unit 31 are arranged radially, and each of the multiple needle-shaped protrusions 311 is made of $NiCo(CO_3)_{0.5}OH$.

Optionally, the reaction kettle is placed into a constant-temperature drying oven for reaction for the first duration under the first temperature that ranges from 80° C. to 200° C., where the first duration ranges from 5 h to 15 h. The reaction kettle is taken out and cooled naturally to a room temperature. A conductive carbon fiber cloth with the support layer 30 is taken out and washed at least once with anhydrous alcohol and at least once with deionized water. The cleaned conductive carbon fiber cloth with the support layer 30 is put into a vacuum drying oven at 50° C. to 80° C. (e.g., 60° C.) for drying for a duration ranging from 8 h to 24 h (e.g., 10 h) and taken out.

The first temperature is not suitable to be too high or too low. If the first temperature is too high or too low, formation of nano-level needle-shaped protrusions 311 may be affected, even the nano-level needle-shaped protrusions 311 may be unable to be formed. The first duration is not suitable to be too short. If the first duration for reaction is too short, the nano-level needle-shaped protrusions 311 are unable to be formed, thereby affecting adhesion of the active material layer 50 on the needle-shaped protrusions 311. If the first duration is too long, productive efficiency of the negative electrode sheet 100 may be reduced.

Specifically, the first temperature may be, but is not limited to, 80° C., 90° C., 100° C., 110° C., 120° C., 130° C., 140° C., 150° C., 160° C., 170° C., 180° C., 190° C., 200° C., etc.

Specifically, the first duration may be, but is not limited to, 5 h, 6 h, 7 h, 8 h, 9 h, 10 h, 11 h, 12 h, 13 h, 14 h, 15 h, etc.

For detailed illustrations of the protruding unit 31 and the needle-shaped protrusion 311, reference can be made to the illustrations of corresponding parts of the foregoing implementations, which are not repeated herein.

Furthermore, the active material layer 50 is formed on the surface of each of the multiple needle-shaped protrusions 311 as follows. The active material layer 50 is formed on the surface of each of the multiple needle-shaped protrusions 311 by a reactant of an active material reacting with a substance on the surface of each of the multiple needle-shaped protrusions 311 in a vapor of the reactant of the active material.

The active material layer 50 is formed by the reactant of the active material reacting with the substance (e.g., $NiCo(CO_3)_{0.5}OH$) on the surface of each needle-shaped protrusion 311 in the vapor of the reactant of the active material, so that the active material layer 50 can be directly grown on the surface of each needle-shaped protrusion 311, and the active material layer 50 can better adhere to the surface of each needle-shaped protrusion 311.

It needs to be noted that, the reactant of the active material reacts with only the substance on the surface of each needle-shaped protrusion 311, and a material of each needle-shaped protrusion 311 is not changed, so that an original structure of each needle-shaped protrusion 311 can be retained, and the needle-shaped protrusions 311 of each protruding unit 31 are still arranged radially.

Furthermore, the active material layer 50 is formed on the surface of each of the multiple needle-shaped protrusions 311 by the reactant of the active material reacting with the substance on the surface of each of the multiple needle-shaped protrusions 311 in the vapor of the reactant of the active material as follows. Under a second temperature ranging from 100° C. to 400° C., in a vapor of antimony trichloride ($SbCl_3$), a $Sb_2O_3$ layer is formed on the surface of each of the multiple needle-shaped protrusions 311 by $SbCl_3$ reacting with $NiCo(CO_3)_{0.5}OH$ on the surface of each of the multiple needle-shaped protrusions 311 for a second duration, where the second duration ranges from 1 h to 5 h, the reactant of the active material is $SbCl_3$, and the active material layer 50 is the $Sb_2O_3$ layer.

Optionally, a preset weight (e.g., 0.1 g) of crystals of $SbCl_3$ is weighed and laid flat in a porcelain boat, the conductive fiber cloth 10 with the support layer 30 (i.e., the conductive fiber cloth 10 subjected to the operation at S202) covers a mouth of the porcelain boat, another porcelain boat is inverted on the conductive fiber cloth 10 with the support layer 30 to fix and clamp the conductive fiber cloth 10 with the support layer 30. The two porcelain boats as a whole are wrapped hermetically with aluminum foil and placed into a tube furnace for reaction for the second duration, where an environment in the tube furnace is set to a vacuum environment under the second temperature ranging from 100° C. to 400° C.

Crystals of $SbCl_3$ may sublimate under the second temperature to form a vapor of $SbCl_3$, the vapor of $SbCl_3$ crystallizes when contacting with the conductive fiber cloth 10 with the support layer 30 and reacts with NiCo$(CO_3)_{0.5}$OH on the surface of each needle-shaped protrusion 311 to form $Sb_2O_3$. When the second temperature is too low, an amount of $SbCl_3$ volatilized is too small, or the crystals of $SbCl_3$ cannot be volatilized to form the vapor of $SbCl_3$, so that $SbCl_3$ is hard to adhere to the surface of the conductive fiber cloth 10. When the second temperature is too high, water of crystallization of NiCo$(CO_3)_{0.5}$OH easily evaporates, so that NiCo$(CO_3)_{0.5}$OH is easily decomposed and thus a structure of each of the nano-level needle-shaped protrusions 311 is destroyed. When the second duration is too short, $SbCl_3$ reacts with NiCo$(CO_3)_{0.5}$OH incompletely to form less active materials of the active material layer 50. When the second duration is too long, energy is wasted, and productive efficiency is too low.

Specifically, the second temperature may be, but is not limited to, 100° C., 120° C., 150° C., 180° C., 200° C., 220° C., 250° C., 280° C., 30° C., 320° C., 350° C., 380° C., 400° C., etc.

Specifically, the second duration may be, but is not limited to, 1 h, 1.5 h, 2 h, 2.5 h, 3 h, 3.5 h, 4 h, 4.5 h, 5 h, etc.

For detailed illustrations of the active material layer 50, reference can be made to the illustrations of corresponding parts of the foregoing implementations, which are not repeated herein.

In some implementations, a weight ratio of $NiCl_2 \cdot 6H_2O$, $CoCl_2 \cdot 6H_2O$, and $SbCl_3$ ranges from 1:2:1.23 to 1:2:2.63. Specifically, the weight ratio of $NiCl_2 \cdot 6H_2O$, $CoCl_2 \cdot 6H_2O$, and $SbCl_3$ may be, but is not limited to, 1:2:1.23, 1:2:1.4, 1:2:1.6, 1:2:1.8, 1:2:2.0, 1:2:2.2, 1:2:2.4, 1:2:2.63, etc. When a content of $SbCl_3$ is too excessive, redundant $SbCl_3$ may be formed on a surface of $Sb_2O_3$, and an electrolyte becomes acidic when chloride ions are dissolved in the electrolyte, which may cause copper foil and aluminum foil of an electrode sheet (e.g., a positive electrode sheet) in a battery to be corroded and penetrated, thereby affecting a normal function of a battery.

In a specific implementation, when in the mixture liquid, a mole concentration of $NiCl_2 \cdot 6H_2O$ is 0.06 mol/L, a mole concentration of $CoCl_2 \cdot 6H_2O$ is 0.12 mol/L, and a mole concentration of urea is 0.36 mol/L, 40 ml of the mixture liquid is weighed and poured into a 50 ml PTFE liner, a carbon fiber cloth is immersed in the mixture liquid, the PTFE liner is placed into a reaction kettle, and the reaction kettle is placed into a constant-temperature drying oven at 120° C. for 8 h. The reaction kettle is taken out and cooled naturally to a room temperature. The carbon fiber cloth is taken out and washed with anhydrous alcohol and deionized water respectively. The cleaned carbon fiber cloth is put into a vacuum drying oven at 60° C. for drying for 10 h and taken out, to obtain NiCo$(CO_3)_{0.5}$OH/carbon fiber cloth. 0.1 g of crystals of $SbCl_3$ is weighed and laid flat in a porcelain boat, the carbon fiber cloth covers a mouth of the porcelain boat, and another porcelain boat is inverted on the carbon fiber cloth to fix and clamp the carbon fiber cloth. The two porcelain boats as a whole are wrapped hermetically with aluminum foil and placed into a tube furnace for 3 h, to obtain $Sb_2O_3$@NiCo$(CO_3)_{0.5}$OH/carbon fiber cloth, where an environment in the tube furnace is set to a vacuum environment under 350° C. PVP and PVDF are weighed according to a weight ratio of 80:20, a total mass fraction of PVP and PVDF is controlled to be at least 10% to mix with water, and an aqueous solution of PVP and PVDF is heated in a water bath under 90° C. until PVP and PVDF are completely dissolved. $Sb_2O_3$@NiCo$(CO_3)_{0.5}$OH/carbon fiber cloth is immersed in the aqueous solution of PVP and PVDF for 1 h, taken out, and placed on copper foil for natural drying at a room temperature, to obtain PVP/$Sb_2O_3$@NiCo$(CO_3)_{0.5}$OH/carbon fiber cloth.

Figure 8:
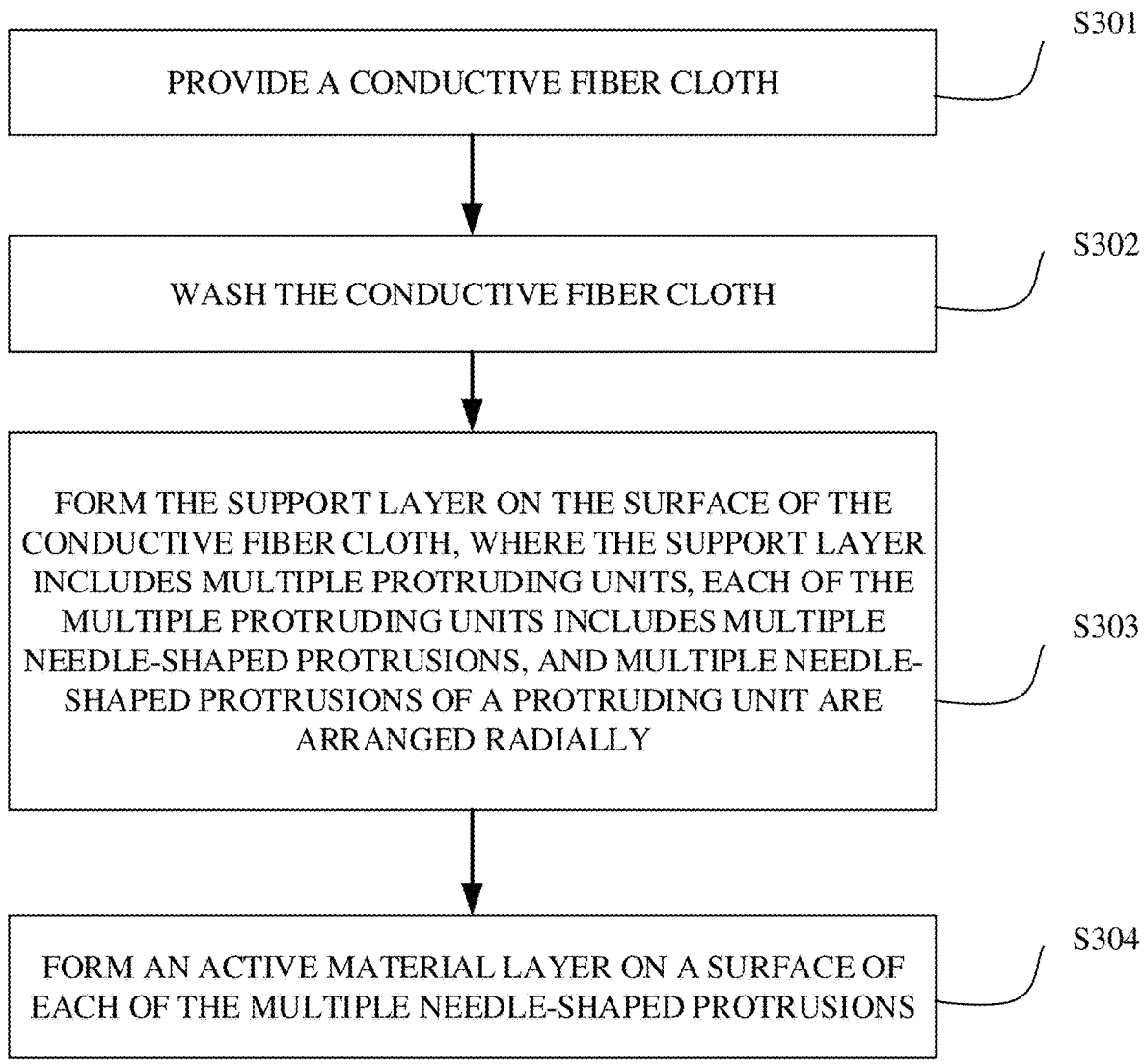
FIG. 8 is a schematic flow chart illustrating a manufacturing method of a negative electrode sheet in another implementation of the disclosure.

FIG. 8 is a schematic flow chart illustrating a manufacturing method of a negative electrode sheet 100 in another implementation of the disclosure. Referring to FIG. 8, the manufacturing method of the negative electrode sheet 100 includes the following.

S301, a conductive fiber cloth 10 is provided.

S302, the conductive fiber cloth 10 is washed.

Specifically, the conductive fiber cloth 10 is cut to be in a size of 2 mm*4 mm, and the conductive fiber cloth 10 after cutting is immersed in a hydrochloric acid solution of 0.1 mol/L for ultrasonic dispersion for 20 min, then immersed in an ethanol solution for ultrasonic dispersion for 20 min, and dried for spare.

Before a support layer 30 is formed on a surface of the conductive fiber cloth 10, the conductive fiber cloth 10 is washed first to remove a surface contaminant and increase hydrophilicity of the conductive fiber cloth 10, so that a hydroxyl group, a hydrogen bond, or the like are formed on the surface of the conductive fiber cloth 10, and in turn an adhesion reaction easily occurs on the surface of the conductive fiber cloth 10, thereby facilitating adhesion of the support layer 30 on the surface of the conductive fiber cloth 10.

S303, the support layer 30 is formed on the surface of the conductive fiber cloth 10, where the support layer 30 includes multiple protruding units 31, each of the multiple protruding units 31 includes multiple needle-shaped protrusions 311, and multiple needle-shaped protrusions 311 of a protruding unit 31 are arranged radially.

S304, an active material layer 50 is formed on a surface of each of the multiple needle-shaped protrusions 311.

For detailed illustrations of the operations at S301, S303, and S304, reference can be made to the illustrations of corresponding parts of the foregoing implementations, which are not repeated herein.

Figure 9:
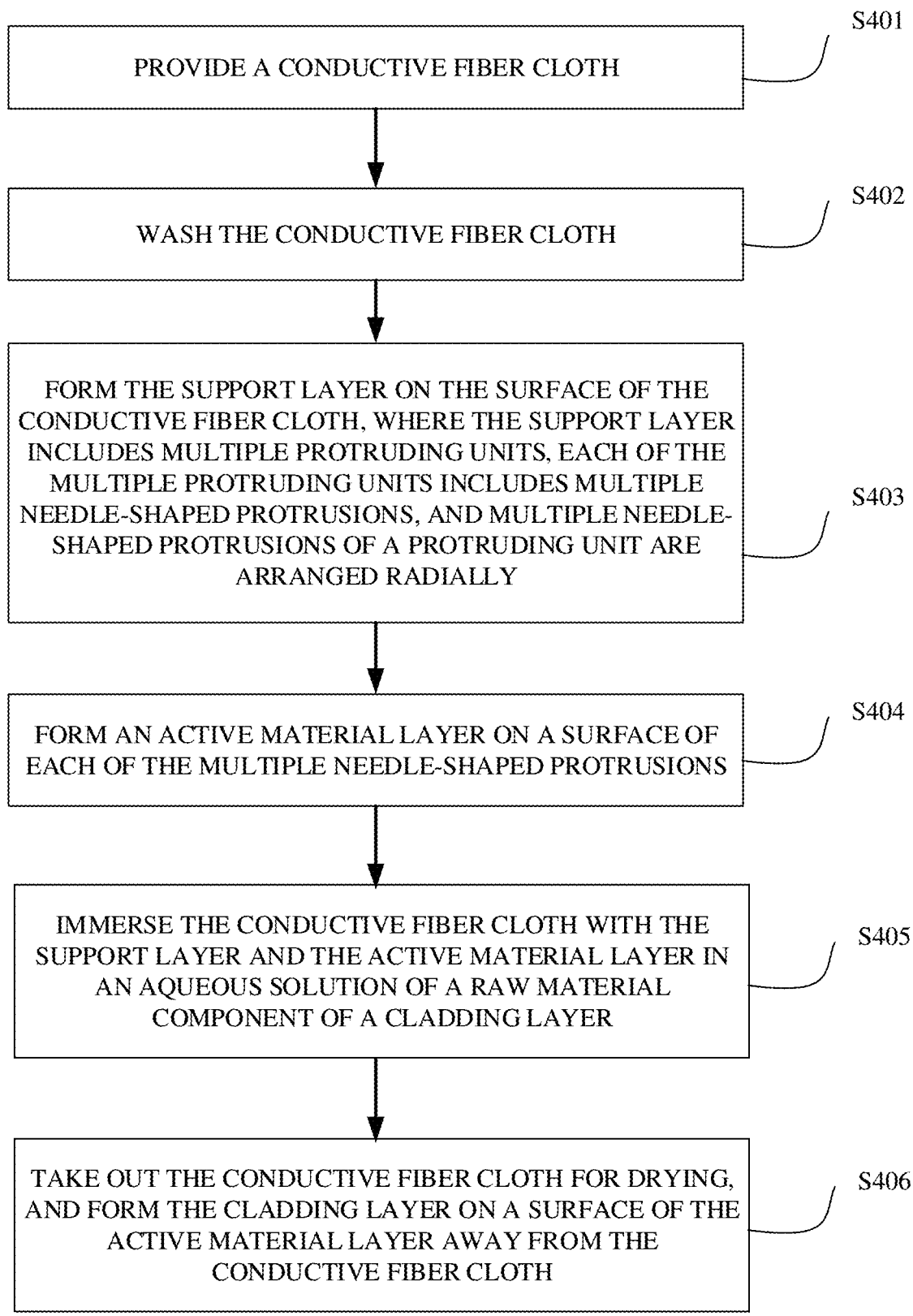
FIG. 9 is a schematic flow chart illustrating a manufacturing method of a negative electrode sheet in yet another implementation of the disclosure.

FIG. 9 is a schematic flow chart illustrating a manufacturing method of a negative electrode sheet 100 in yet another implementation of the disclosure. Referring to FIG. 9, the manufacturing method of the negative electrode sheet 100 includes the following.

S401, a conductive fiber cloth 10 is provided.

S402, the conductive fiber cloth 10 is washed.

S403, the support layer 30 is formed on a surface of the conductive fiber cloth 10, where the support layer 30 includes multiple protruding units 31, each of the multiple protruding units 31 includes multiple needle-shaped protrusions 311, and multiple needle-shaped protrusions 311 of a protruding unit 31 are arranged radially.

S404, an active material layer 50 is formed on a surface of each of the multiple needle-shaped protrusions 311.

For detailed illustrations of the operations at S401-S404, reference can be made to the illustrations of corresponding parts of the foregoing implementations, which are not repeated herein.

S405, the conductive fiber cloth 10 with the support layer 30 and the active material layer 50 is immersed in an aqueous solution of a raw material component of a cladding layer 70.

Optionally, the raw material component of the cladding layer 70 is added to water, and dissolved in water by heating, to form the aqueous solution of the raw material component of the cladding layer 70. The conductive fiber cloth 10 with the support layer 30 and the active material layer 50 is immersed in the aqueous solution of the raw material component of the cladding layer 70, so that the raw material component of the cladding layer 70 can adhere to the surface of the active material layer 50.

In a specific implementation, the cladding layer 70 is made of PVP and PVDF. PVP and PVDF are weighed respectively according to a preset weight ratio (e.g., a weight ratio of PVP and PVDF is 8:2), put into water, and heated in a water bath under 85° C. to 95° C. (e.g., 90° C.) until PVP and PVDF are completely dissolved, to form an aqueous solution of PVP and PVDF in which a weight fraction of PVP and PVDF ranges from 10% to 20%. The conductive fiber cloth 10 is immersed in the aqueous solution of PVP and PVDF for a duration ranging from 30 min to 2 h (e.g., 1 h).

S406, the conductive fiber cloth 10 is taken out for drying, and the cladding layer 70 is formed on a surface of the active material layer 50 away from the conductive fiber cloth 10.

Optionally, the conductive fiber cloth 10 with the support layer 30 and the active material layer 50 is taken out and placed on copper foil for natural drying at a room temperature.

The negative electrode sheet 100 of the disclosure will be further illustrated through specific implementations.

Implementation 1

The negative electrode sheet 100 of the implementation is manufactured through the following.

1) A carbon fiber cloth is cut to be in a size of 2 mm*4 mm, and the carbon fiber cloth after cutting is immersed in a hydrochloric acid solution of 0.1 mol/L for ultrasonic dispersion for 20 min, then immersed in an ethanol solution for ultrasonic dispersion for 20 min, and dried for spare.

2) A mixture liquid of $NiCl_2 \cdot 6H_2O$, $CoCl_2 \cdot 6H_2O$, and urea is configured, to make that in the mixture liquid, a mole concentration of $NiCl_2 \cdot 6H_2O$ is 0.06 mol/L, a mole concentration of $CoCl_2 \cdot 6H_2O$ is 0.12 mol/L, and a mole concentration of urea is 0.36 mol/L (i.e., a mole ratio of $NiCl_2 \cdot 6H_2O$, $CoCl_2 \cdot 6H_2O$, and urea is 1:2:6).

3) 40 ml of the mixture liquid is weighed and poured into a 50 ml PTFE liner, the carbon fiber cloth manufactured after performing the operation at 1) is immersed in the mixture liquid, the PTFE liner is placed into a reaction kettle, and the reaction kettle is placed into a constant-temperature drying oven at 120° C. for 8 h. The reaction kettle is taken out and cooled naturally to a room temperature. The carbon fiber cloth is taken out and washed with anhydrous alcohol and deionized water respectively. The cleaned carbon fiber cloth is put into a vacuum drying oven at 60° C. for drying for 10 h and taken out, to obtain a carbon fiber cloth with NiCo$(CO_3)_{0.5}$OH (i.e., NiCo$(CO_3)_{0.5}$OH/carbon fiber cloth).

4) 0.1 g of crystals of $SbCl_3$ is weighed and laid flat in a porcelain boat, NiCo$(CO_3)_{0.5}$OH/carbon fiber cloth covers a mouth of the porcelain boat, and another porcelain boat is inverted on NiCo$(CO_3)_{0.5}$OH/carbon fiber cloth to fix and clamp NiCo$(CO_3)_{0.5}$OH/carbon fiber cloth. The two porcelain boats as a whole are wrapped hermetically with aluminum foil and placed into a tube furnace for 3 h, to obtain $Sb_2O_3$@NiCo$(CO_3)_{0.5}$OH/carbon fiber cloth, where an environment in the tube furnace is set to a vacuum environment under 350° C.

5) PVP and PVDF are weighed according to a weight ratio of 80:20, a total mass fraction of PVP and PVDF is controlled to be at least 10% to mix with water, and an aqueous solution of PVP and PVDF is heated in a water bath under 90° C. until PVP and PVDF are completely dissolved. $Sb_2O_3$@NiCo$(CO_3)_{0.5}$OH/carbon fiber cloth is immersed in the aqueous solution of PVP and PVDF for 1 h, taken out, and placed on copper foil for natural drying at a room temperature, to obtain PVP/$Sb_2O_3$@NiCo$(CO_3)_{0.5}$OH/carbon fiber cloth (i.e., the negative electrode sheet 100).

Comparative Implementation 1 and Comparative Implementation 2

The negative electrode sheet 100 in each implementation is manufactured through the following.

1) A carbon fiber cloth is cut to be in a size of 2 mm*4 mm, and the carbon fiber cloth after cutting is immersed in a hydrochloric acid solution of 0.1 mol/L for ultrasonic dispersion for 20 min, then immersed in an ethanol solution for ultrasonic dispersion for 20 min, and dried for spare.

2) A mixture liquid of $NiCl_2 \cdot 6H_2O$, $CoCl_2 \cdot 6H_2O$, and urea is configured, to make that in the mixture liquid, a mole concentration of $NiCl_2 \cdot 6H_2O$ is 0.06 mol/L, a mole concentration of $CoCl_2 \cdot 6H_2O$ is 0.12 mol/L, and a mole concentration of urea is 0.36 mol/L (i.e., a mole ratio of $NiCl_2 \cdot 6H_2O$, $CoCl_2 \cdot 6H_2O$, and urea is 1:2:6).

3) 40 ml of the mixture liquid is weighed and poured into a 50 ml PTFE liner, the carbon fiber cloth manufactured after performing the operation at 1) is immersed in the mixture liquid, the PTFE liner is placed into a reaction kettle, and the reaction kettle is placed into a constant-temperature drying oven at 120° C. for 8 h. The reaction kettle is taken out and cooled naturally to a room temperature. The carbon fiber cloth is taken out and washed with anhydrous alcohol and deionized water respectively. The cleaned carbon fiber cloth is put into a vacuum drying oven at 60° C. for drying for 10 h and taken out, to obtain a carbon fiber cloth with NiCo$(CO_3)_{0.5}$OH (i.e., NiCo$(CO_3)_{0.5}$OH/carbon fiber cloth).

4) NiCo$(CO_3)_{0.5}$OH/carbon fiber cloth is immersed in a $SbCl_3$ ethanol solution of 1.0 mol/L (PH=3~4). In comparative implementation 1, NiCo$(CO_3)_{0.5}$OH/carbon fiber cloth is sealed with a cling film, placed into a room-temperature environment for 12 h, and numbered as 2. In comparative implementation 2, NiCo$(CO_3)_{0.5}$OH/carbon fiber cloth is placed into a vacuum drying oven at 60° C. for 12 h, and numbered as 2#. The negative electrode sheet 100 obtained after reaction in comparative implementation 1 and the negative electrode sheet 100 obtained after reaction in comparative implementation 2 are taken out from the solution, washed with ethanol three times, and placed into the vacuum drying oven at 60° C. for drying.

Comparative Implementation 3

NiCo$(CO_3)_{0.5}$OH/carbon fiber cloth in the comparative implementation is manufactured through the following.

1) A carbon fiber cloth is cut to be in a size of 2 mm*4 mm, and the carbon fiber cloth after cutting is immersed in a hydrochloric acid solution of 0.1 mol/L for ultrasonic dispersion for 20 min, then immersed in an ethanol solution for ultrasonic dispersion for 20 min, and dried for spare.

2) A mixture liquid of $NiCl_2 \cdot 6H_2O$, $CoCl_2 \cdot 6H_2O$, and urea is configured, to make that in the mixture liquid, a mole concentration of $NiCl_2 \cdot 6H_2O$ is 0.06 mol/L, a mole concentration of $CoCl_2 \cdot 6H_2O$ is 0.12 mol/L, and a mole concentration of urea is 0.72 mol/L (i.e., a mole ratio of $NiCl_2 \cdot 6H_2O$, $CoCl_2 \cdot 6H_2O$, and urea is 1:2:12).

3) 40 ml of the mixture liquid is weighed and poured into a 50 ml PTFE liner, the carbon fiber cloth manufactured after performing the operation at 1) is immersed in the mixture liquid, the PTFE liner is placed into a reaction kettle, and the reaction kettle is placed into a constant-temperature drying oven at 120° C. for 8 h. The reaction kettle is taken out and cooled naturally to a room temperature. The carbon fiber cloth is taken out and washed with anhydrous alcohol and deionized water respectively. The cleaned carbon fiber cloth is put into a vacuum drying oven at 60° C. for drying for 10 h and taken out, to obtain a carbon fiber cloth with NiCo$(CO_3)_{0.5}$OH (i.e., NiCo$(CO_3)_{0.5}$OH/carbon fiber cloth).

Test Analysis

Test 1: Each of the carbon fiber cloth obtained after performing the operation at 1), NiCo$(CO_3)_{0.5}$OH/carbon fiber cloth obtained after performing the operation at 3), Sb$_2$O$_3$@NiCo$(CO_3)_{0.5}$OH/carbon fiber cloth obtained after performing the operation at 4), and PVP/Sb$_2$O$_3$@NiCo$(CO_3)_{0.5}$OH/carbon fiber cloth obtained after performing the operation at 5) in implementation 1 is bent by holding two ends with tweezers.

Figure 10:
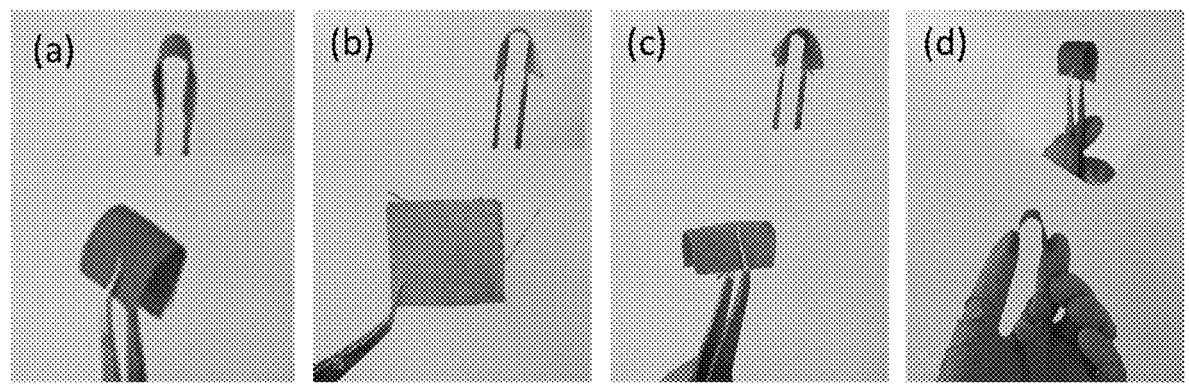
FIG. 10 is a bending test diagram of a carbon fiber cloth obtained in each process of manufacturing a negative electrode sheet in implementation 1 of the disclosure.

Test results are illustrated in FIG. 10. In FIG. 10, (a) is a bending test diagram of the carbon fiber cloth obtained after performing the operation at 1), (b) is a bending test diagram of NiCo$(CO_3)_{0.5}$OH/carbon fiber cloth obtained after performing the operation at 3), (c) is a bending test diagram of Sb$_2$O$_3$@NiCo$(CO_3)_{0.5}$OH/carbon fiber cloth obtained after performing the operation at 4), and (d) is a bending test diagram of PVP/Sb$_2$O$_3$@NiCo$(CO_3)_{0.5}$OH/carbon fiber cloth obtained after performing the operation at 5). As can be known from FIG. 10, during manufacturing of the negative electrode sheet 100 of the disclosure, an intermediate product obtained at each phase has a good bending performance that the intermediate product can be bent nearly 180°, and peeling or cracking of the active material layer 50 may not occur, thereby better preventing the active material layer 50 from being peeled off from a current collector.

Figure 11:
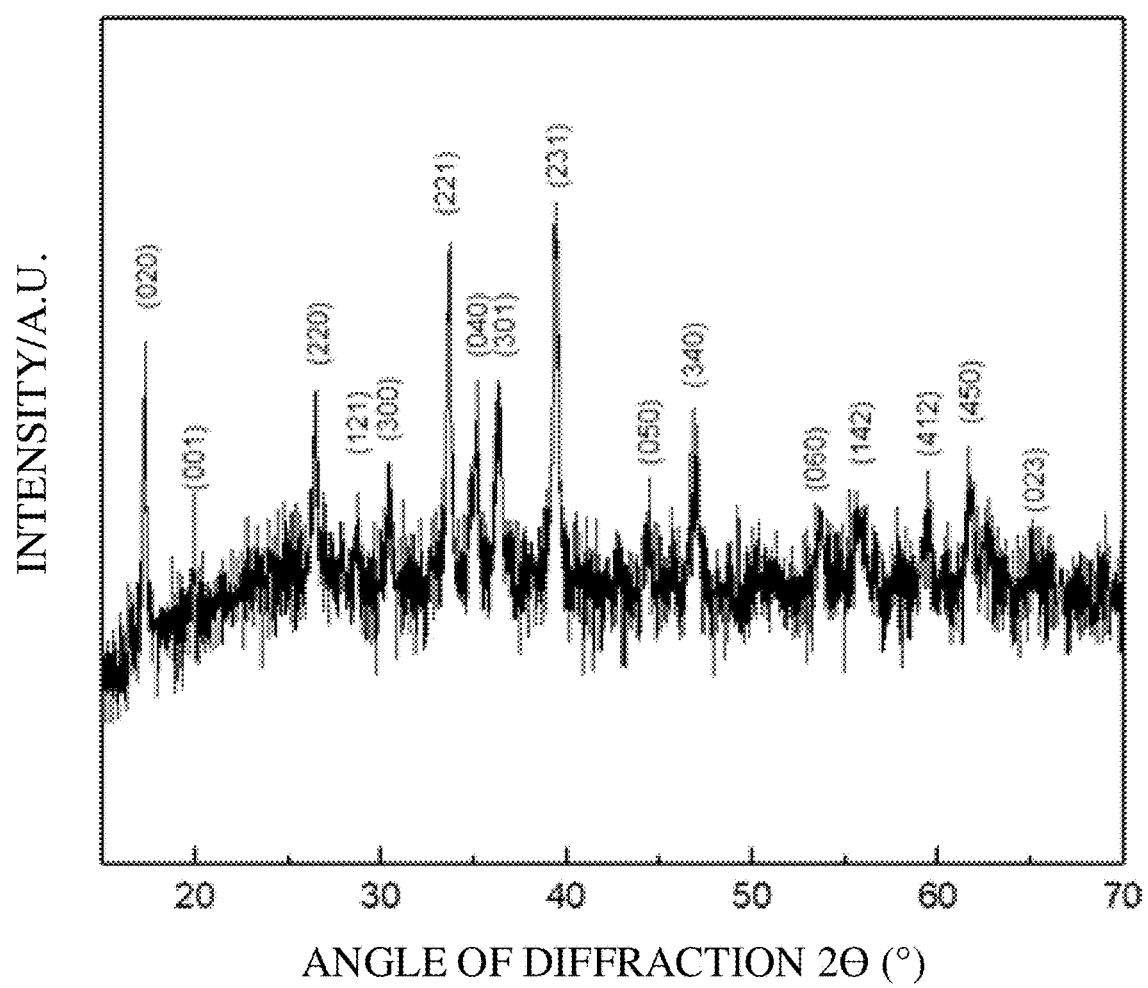
FIG. 11 is an X-ray diffraction (XRD) pattern of basic cobalt nickel carbonate (NiCo(CO$_3$)$_{0.5}$OH)/carbon fiber cloth in implementation 1 of the disclosure.

Test 2: An X-ray diffraction (XRD) pattern as illustrated in FIG. 11 is obtained by performing XRD analysis on NiCo$(CO_3)_{0.5}$OH/carbon fiber cloth obtained after performing the operation at 3). As can be known from FIG. 11, relatively intense peaks occur when 2Θ=17.51° (020), 26.75° (220), 30.44° (300), 33.82° (221), 35.48° (040), 36.53° (301), 39.53° (231), 47.33° (340), 59.89° (412), 62.21° (450), etc., and these diffraction peaks meet data provided in PDF #48-0083 in a PDF card library, where the data indicates a substance with a structure of Co$(CO_3)_{0.5}$(OH)·0.11H$_2$O which belongs to an orthorhombic system. Relatively intense peaks occur when 2Θ=17.59° (120), 19.19° (200), 24.29° (130), 28.8° (001), 31.31° (−111), 32.66° (320), 34.76° (−201), 35.06° (201), 51.81° (520), 59.81° (002), 59.98° (600), 60.54° (521), etc., and these diffraction peaks meet data provided in PDF #35-0501 in the PDF card library, where the data indicates a substance with a structure of Ni$_2$(CO$_3$)(OH)$_2$. Therefore, a substance obtained after performing the operation at 3) may be NiCo$(CO_3)_{0.5}$OH produced by in-situ compounding of cobalt and nickel.

Figure 12:
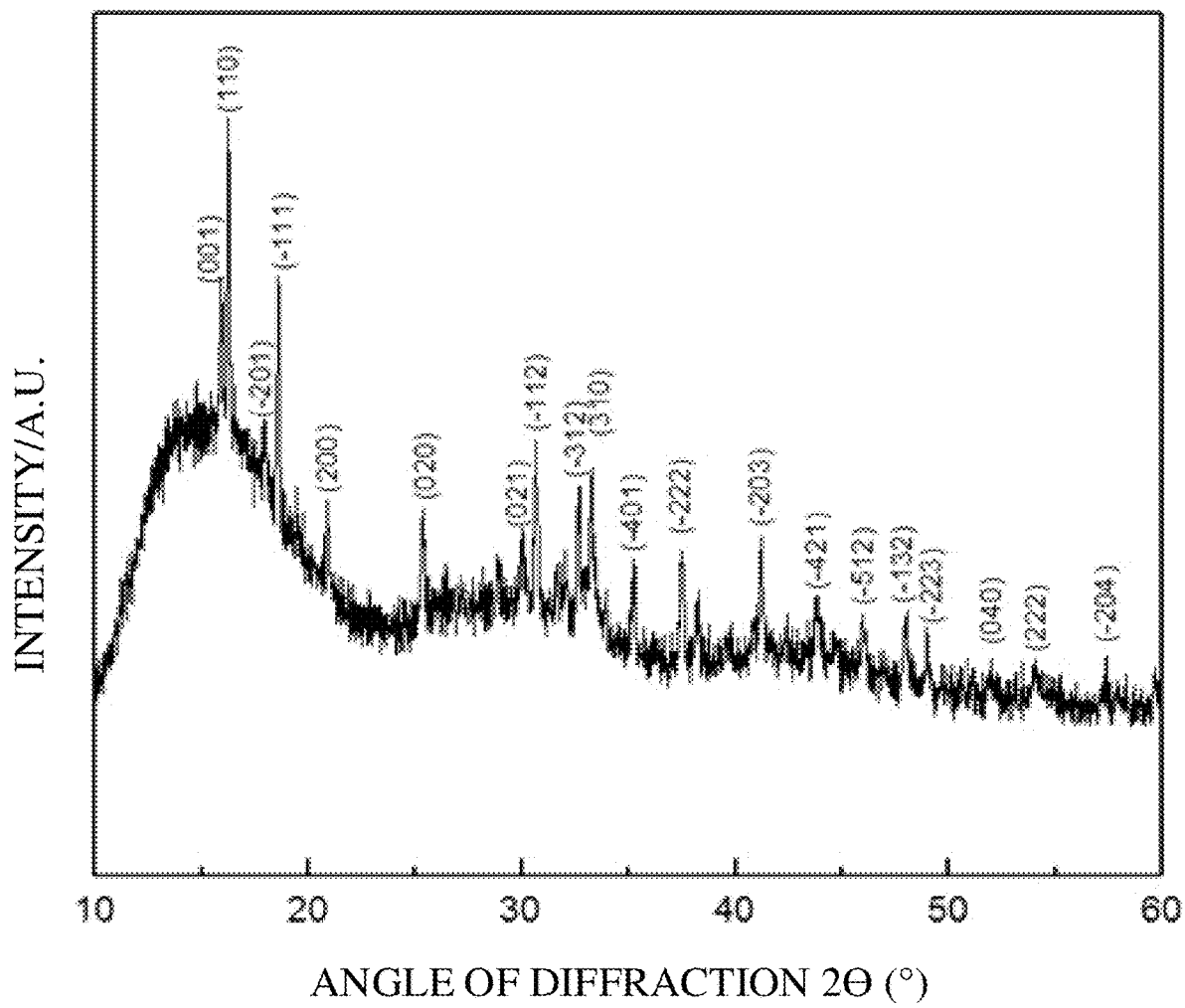
FIG. 12 is an XRD pattern of antimony trioxide (Sb$_2$O$_3$) @NiCo(CO$_3$)$_{0.5}$OH/carbon fiber cloth in implementation 1 of the disclosure.

Test 3: An XRD pattern as illustrated in FIG. 12 is obtained by performing XRD analysis on Sb$_2$O$_3$@NiCo$(CO_3)_{0.5}$OH/carbon fiber cloth obtained after performing the operation at 4). As can be known from FIG. 12, relatively intense peaks occur when 2Θ=15.76° (001), 16.09° (110), 18.44° (−111), 25.25° (020), 30.53° (−112), 32.52° (220), 33.04° (310), 37.38° (−222), 40.98° (400), 47.92° (−132), etc., and these diffraction peaks meet data provided in PDF #80-1559, where the data indicates a substance with a structure of CoCl$_2$·(H$_2$O)$_6$. There is a wide and intense bulge when 2θ ranges from 10° to 25°, which is elevation of a small-angle diffraction peak caused by the carbon fiber cloth. Relatively intense peaks occur when 2Θ=15.92° (001), 16.19° (110), 18.52° (−111), 30.76° (−112), 33.52° (310), 37.56° (−222), 48.06° (−132), etc., and these diffraction peaks meet data provided in PDF #74-1191, where the data indicates a substance with a structure of NiCl$_2$·(H$_2$O)$_6$. It is proved that NiCo$(CO_3)_{0.5}$(OH)·0.11H$_2$O has reacted with SbCl$_3$, and a reaction equation is reaction equation (1) as follows: NiCo$(CO_3)_{0.5}$(OH)+SbCl$_3$→NiCl$_2$+CoCl$_2$+Sb$_2$O$_3$+CO$_2$↑.

As can be known from reaction equation (1), there is a carbon dioxide (CO$_2$) gas and water of crystallization in reaction products, and thus it is presumed that mesopores are defined in the surface of each needle-shaped protrusion 311, making Sb$_2$O$_3$ have a larger contact area with NiCo$(CO_3)_{0.5}$(OH) 0.11H$_2$O, which is beneficial for firm growth of Sb$_2$O$_3$.

As illustrated in FIG. 12, relatively intense peaks occur when 2Θ=19.08° (110), 24.41° (−111), 28.86° (−211), 30.55° (211), 32.06° (002), 33.75° (020), 37.50° (311), 47.24° (500), 52.20° (222), 57.21° (322), etc., and these diffraction peaks meet data provided in PDF #89-1765, where the data indicates a substance with a structure of Sb$_3$O$_4$Cl, which may be generated by the following. During reaction of NiCo$(CO_3)_{0.5}$OH with SbCl$_3$, an excessive amount of SbCl$_3$ is put into the porcelain boat and evaporated for a relatively long time, resulting in reaction of SbCl$_3$ with water of crystallization in reaction products according to reaction equation (2) to form SbOCl, and thus forming product Sb$_2$O$_3$SbOCl. Alternatively, the excessive amount SbCl$_3$ directly reacts with the product Sb$_2$O$_3$ according to reaction equation (3). Therefore, the amount of crystals of SbCl$_3$ added cannot be excessive, otherwise by-products will be formed. When the negative electrode sheet 100 is applied to the battery, chloride ions in the by-products are dissolved in the electrolyte, causing the electrolyte to be acidic, which in turn causes aluminum foil and copper foil of the electrode sheet (such as a positive electrode sheet) in the battery to be corroded and penetrated, affecting a normal function of the battery.

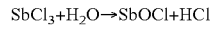

SbCl$_3$+H$_2$O→SbOCl+HCl　　　　Reaction equation (2):

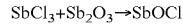

Figure 13:
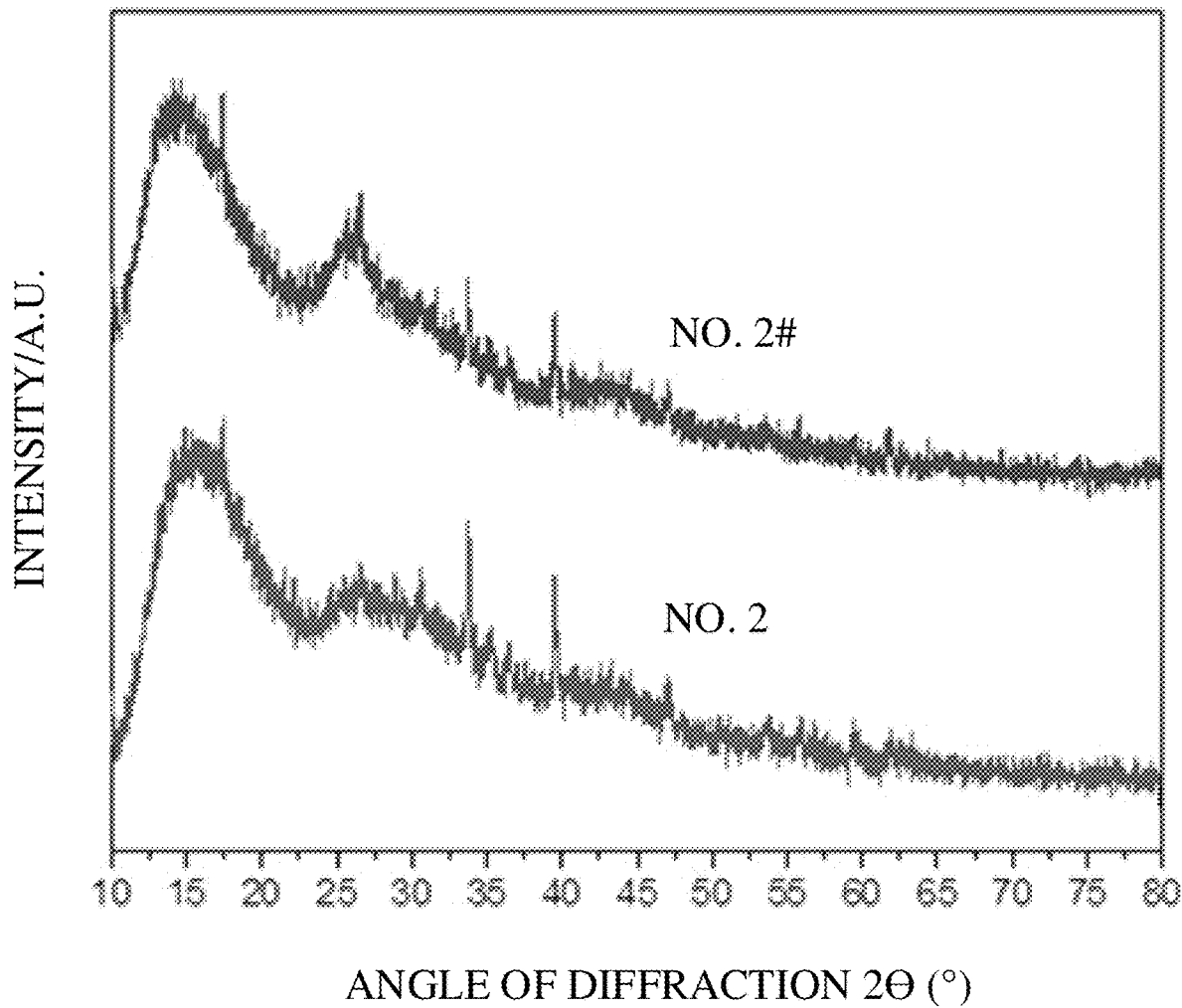
FIG. 13 is an XRD pattern of a negative electrode sheet in comparative implementation 1 (number (No.) 2) and a negative electrode sheet in comparative implementation 2 (No. 2#) of the disclosure.

SbCl$_3$+Sb$_2$O$_3$→SbOCl　　　　Reaction equation (3):

An XRD pattern as illustrated in FIG. 13 is obtained by performing XRD analysis on the negative electrode sheet 100 obtained in comparative implementation 1 and the negative electrode sheet 100 obtained in comparative implementation 2.

As can be known from FIG. 13, diffraction peaks of the negative electrode sheet 100 obtained in comparative implementation 1 and diffraction peaks of the negative electrode sheet 100 obtained in comparative implementation 3 are scrambled, and no characteristic peaks of Sb$_2$O$_3$ appear, indicating that the sample does not contain Sb$_2$O$_3$, which may be due to interference on detection caused by the large amount of carbon fiber cloth matrix in the sample.

Figure 14:
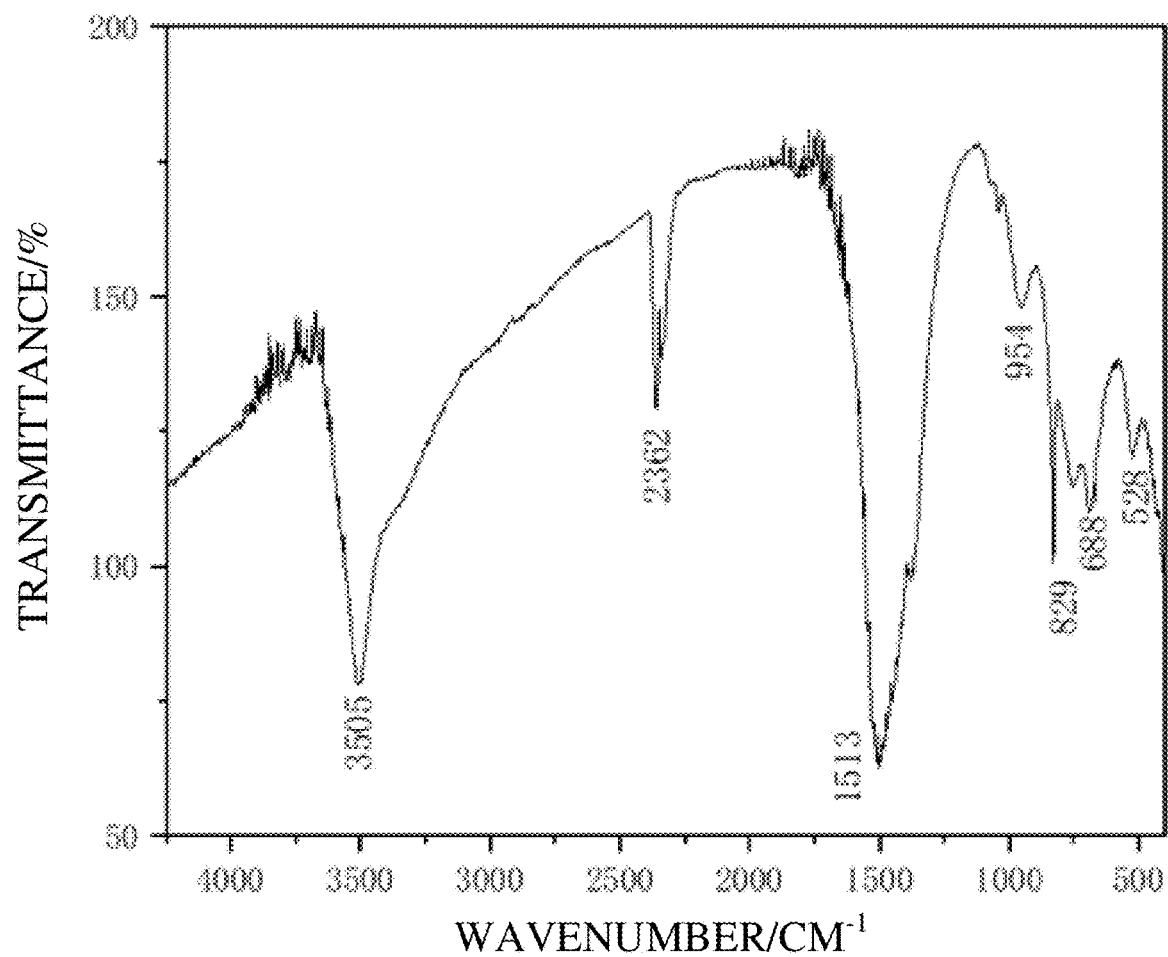
FIG. 14 is an infrared spectrogram of NiCo(CO$_3$)$_{0.5}$OH/carbon fiber cloth in implementation 1 of the disclosure.

Test 4: Test results as illustrated in FIG. 14 are obtained by performing fourier-transform infrared spectroscopy (FT-IR) on NiCo$(CO_3)_{0.5}$OH/carbon fiber cloth obtained after performing the operation at 3) in implementation 1. As illustrated in FIG. 14, a relatively intense absorption peak at 3505 cm$^{-1}$ is caused by stretching vibration of ν(H . . . OH), which is due to insertion of interlayer water molecules between lattices in NiCo$(CO_3)_{0.5}$OH/carbon fiber cloth and formation of hydrogen bonds by O—H groups within NiCo$(CO_3)_{0.5}$OH/carbon fiber cloth layer; an absorption peak at 2362 cm$^{-1}$ may be caused due to NCO$^-$ or CN$^-$ generated by thermal decomposition of urea; and there is an intense and sharp peak at 1513 cm$^{-1}$ corresponding to a characteristic absorption peak of CO$_3^{2-}$, which is produced by decomposition of urea in a process of hydrothermal reaction. A sharp and narrow peak at 829 cm$^{-1}$ is caused by stretching vibration of Ni—O bond, and absorption peaks at 528 cm$^{-1}$ and 688 cm$^{-1}$ correspond to absorption peaks of stretching vibration of M-O, O-M-O, and M-O-M (M=Ni and Co) bonds. In summary, the results of the FT-IR once again confirm successful preparation of the substance NiCo$(CO_3)_{0.5}$(OH)·0.11H$_2$O.

Figure 15:
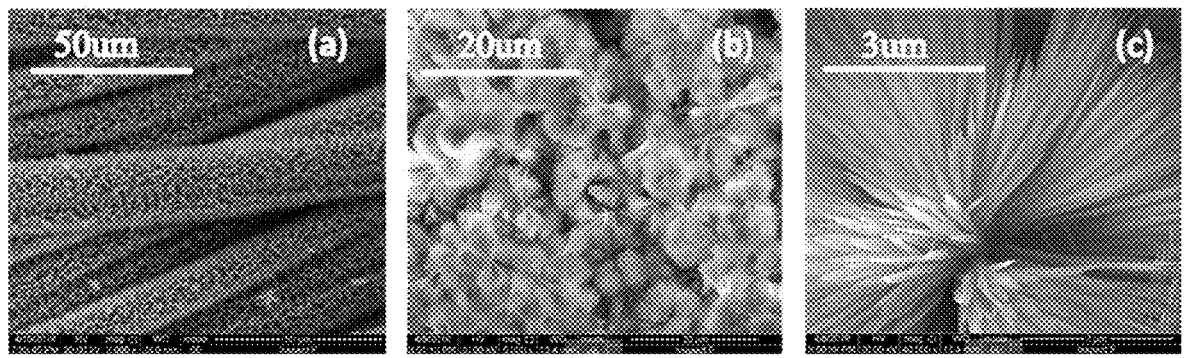
FIG. 15 is a scanning electron microscope (SEM) diagram of NiCo(CO$_3$)$_{0.5}$OH/carbon fiber cloth in implementation 1 of the disclosure, where (a), (b), and (c) in FIG. 15 are SEM diagrams at different magnifications, respectively.

Test 5: A test result as illustrated in FIG. 15 is obtained by performing a scanning electron microscope (SEM) test on NiCo$(CO_3)_{0.5}$OH/carbon fiber cloth obtained after performing the operation at 3) in implementation 1. As can be seen clearly from (a) and (b) in FIG. 15, the needle-shaped protrusions 311 (nano-needles) are grown uniformly and densely. As can be known from (c) in FIG. 15, the needle-shaped protrusions 311 (nano-needles) have smooth surfaces and uniform thicknesses, and are grown in a radial (flower cluster) pattern overall. An average diameter of each of NiCo$(CO_3)_{0.5}$(OH) needle-shaped protrusions 311 (nano-needles) is 154 nm, which has an extremely strong anchor performance when growing on the carbon fiber cloth, and thus has an extremely strong force with the carbon fiber cloth, which facilitates subsequent reaction with SbCl$_3$. There is a wide space between adjacent needle-shaped protrusions 311, which can effectively avoid rapid structural collapse and pulverization caused by expansion of an active material of the active material layer 50, thereby improving electrochemical performance of the electrode sheet.

Figure 16:
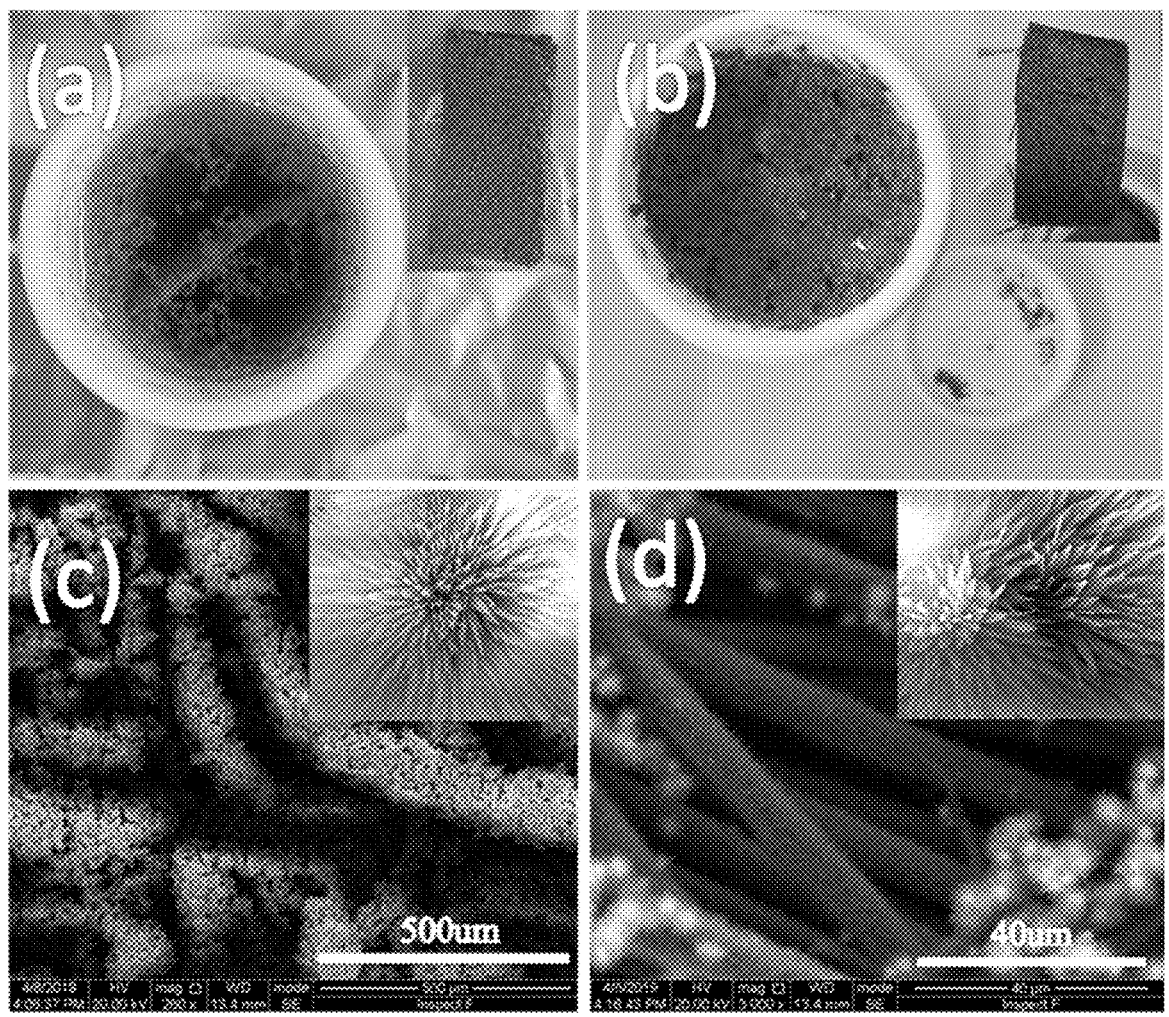
In FIG. 16, (a) is an adhesion test diagram of NiCo (CO$_3$)$_{0.5}$OH/carbon fiber cloth in implementation 1, (c) is an SEM diagram of NiCo(CO$_3$)$_{0.5}$OH/carbon fiber cloth in implementation 1, (b) is an adhesion test diagram of NiCo (CO$_3$)$_{0.5}$OH/carbon fiber cloth in comparative implementation 3, and (d) is an SEM diagram of NiCo(CO$_3$)$_{0.5}$OH/carbon fiber cloth in comparative implementation 3.

Test 6: Test results as illustrated in (a) to (d) in FIG. 16 are obtained by performing an adhesion test and an SEM test on NiCo$(CO_3)_{0.5}$OH/carbon fiber cloth obtained in implementation 1 and performing an adhesion test and an SEM test on NiCo$(CO_3)_{0.5}$OH/carbon fiber cloth obtained in comparative implementation 3. In FIG. 16, (a) is an adhesion test diagram of NiCo$(CO_3)_{0.5}$OH/carbon fiber cloth in implementation 1, (c) is an SEM diagram of NiCo$(CO_3)_{0.5}$OH/carbon fiber cloth in implementation 1, (b) is an adhesion test diagram of NiCo$(CO_3)_{0.5}$OH/carbon fiber cloth in comparative implementation 3, and (d) is an SEM diagram of NiCo$(CO_3)_{0.5}$OH/carbon fiber cloth in comparative implementation 3. In FIG. 16, a lower left corner of (c) and a lower left corner of (d) are low-magnification magnified views, and an upper right corner of (c) and an upper right corner of (d) are high-magnification magnified views. The adhesion test is to repeatedly put NiCo$(CO_3)_{0.5}$OH/carbon fiber cloth into deionized water and take it out again, cycling back and forth.

As can be known from (a) and (b) in FIG. 16, NiCo$(CO_3)_{0.5}$OH of NiCo$(CO_3)_{0.5}$OH/carbon fiber cloth manufactured in implementation 1 better adheres to the carbon fiber cloth than NiCo$(CO_3)_{0.5}$OH of NiCo$(CO_3)_{0.5}$OH/carbon fiber cloth manufactured in comparative implementation 3. For NiCo$(CO_3)_{0.5}$OH/carbon fiber cloth manufactured in comparative implementation 3, NiCo$(CO_3)_{0.5}$OH does not adhere tightly to the carbon fiber cloth, and large areas of NiCo$(CO_3)_{0.5}$OH are peeled off during washing.

As can be seen from the low-magnification magnified view in (c) in FIG. 16, when the mole ratio of NiCl$_2$·6H$_2$O, CoCl$_2$·6H$_2$O, and urea is 1:2:6, the needle-shaped protrusions (needle-shaped nano flower cluster) 311 arranged radially are grown uniformly and densely. As can be seen from the high-magnification magnified view in (c) in FIG. 16, the needle-shaped protrusions 311 (nano needles) are well dispersed among each other, radiated in all directions, and have a relatively large SSA and open spaces. Compared with (c) in FIG. 16, it is obvious from the low-magnification magnified view in (d) in FIG. 16 that flower clusters are grow not tightly and distributed unevenly. As can be seen from the high-magnification magnified view in (d) in FIG. 16, every two or three nano needles adhere to each other and are poorly dispersed. Therefore, optimal results are obtained when the molar ratio of NiCl$_2$·6H$_2$O, CoCl$_2$·6H$_2$O, and urea is 1:2:6 for manufacturing the needle-shaped protrusions 311.

Figure 17:
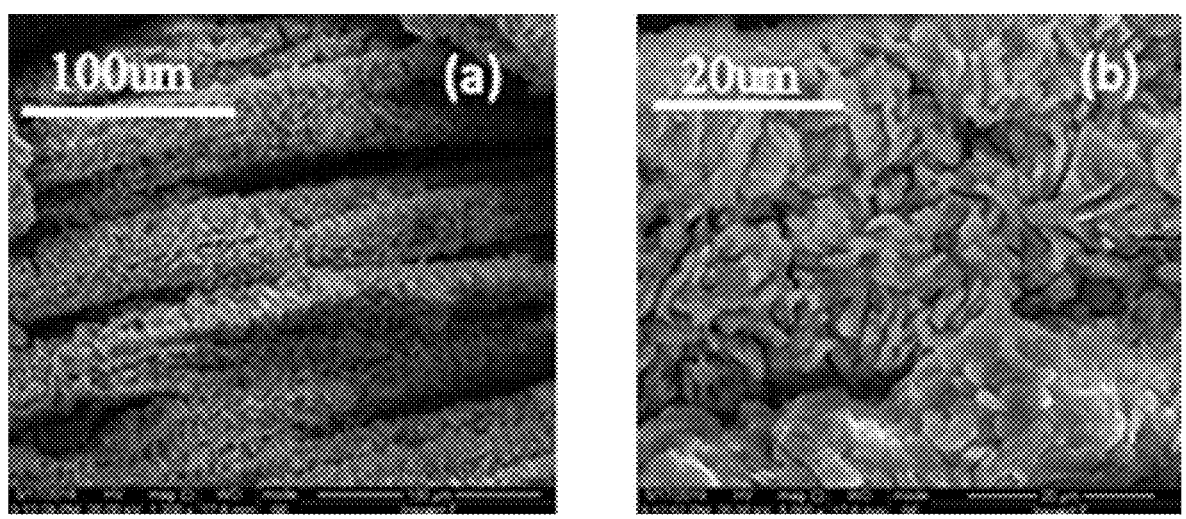
FIG. 17 is an SEM diagram of Sb$_2$O$_3$@NiCo(CO$_3$)$_{0.5}$OH/carbon fiber cloth manufactured in implementation 1, where (a) is a low-magnification SEM diagram, and (b) is a high-magnification SEM diagram.

Test 7: A test result as illustrated in FIG. 17 is obtained by performing an SEM test on Sb$_2$O$_3$@NiCo$(CO_3)_{0.5}$OH/carbon fiber cloth manufactured in implementation 1, where (a) is a low-magnification SEM pattern, and (b) is a high-magnification SEM pattern. As can be known from (a) in FIG. 17, reaction of SbCl$_3$ with NiCo$(CO_3)_{0.5}$OH is uniform and dense. As can be known from (b) in FIG. 17, Sb$_2$O$_3$ generated is lamellar, which may be due to a long etching time, causing a large amount of SbCl$_3$ to deposit and react on the surfaces of the needle-shaped protrusions 311 (nano needle), resulting in mutual bonding. An average thickness of a lamellar structure of Sb$_2$O$_3$ is about 670 nm, and Sb$_2$O$_3$ has a large SSA.

Figure 18:
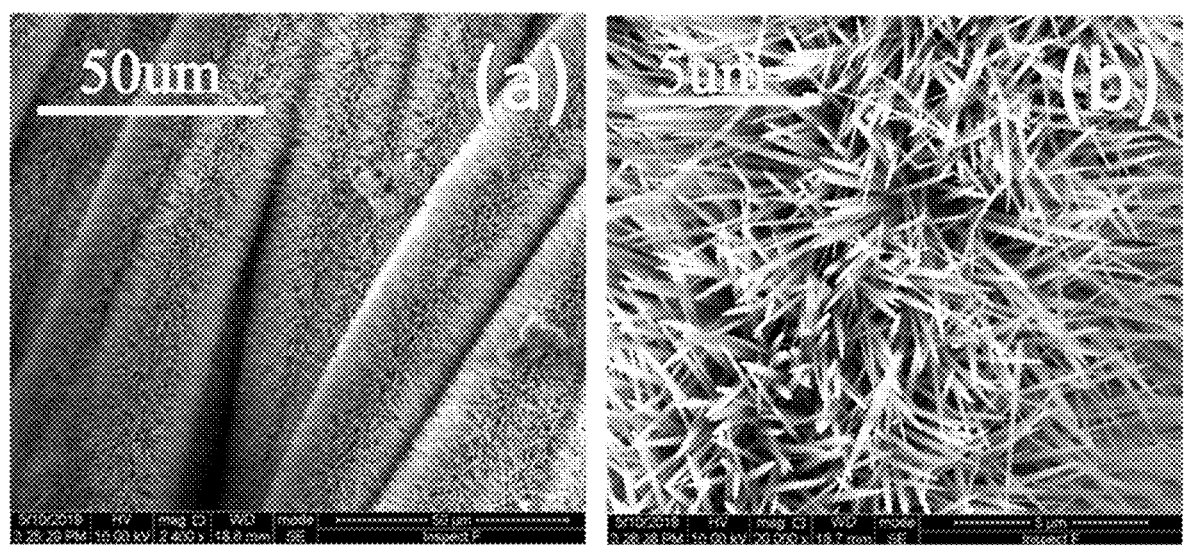
FIG. 18 is an SEM diagram of Sb$_2$O$_3$@NiCo(CO$_3$)$_{0.5}$OH/carbon fiber cloth in comparative implementation 2, where (a) is a low-magnification SEM diagram, and (b) is a high-magnification SEM diagram.
Figure 19:
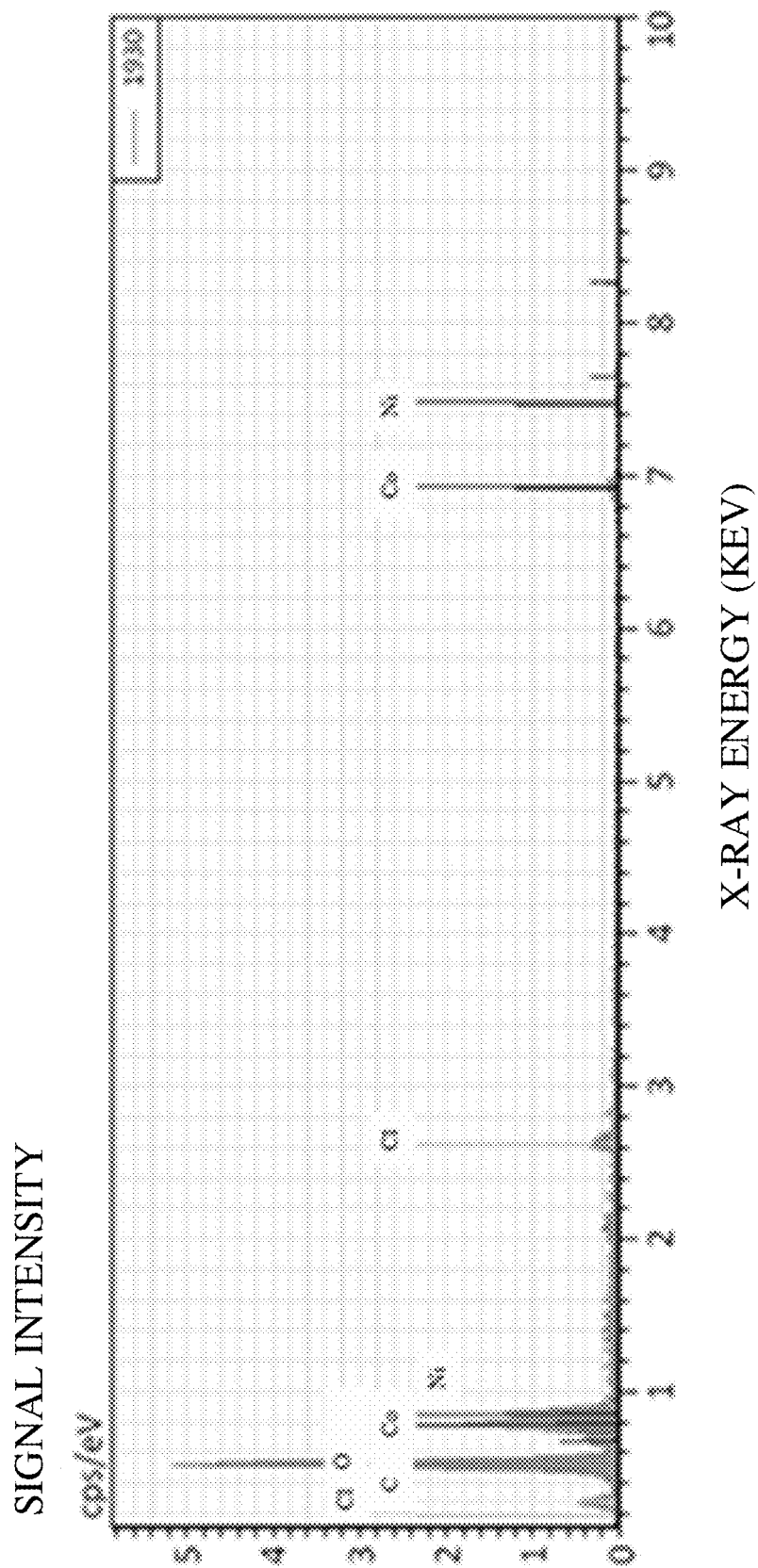
FIG. 19 is an energy dispersive spectroscopy (EDS) diagram of Sb$_2$O$_3$@NiCo(CO$_3$)$_{0.5}$OH/carbon fiber cloth in comparative implementation 2.

Test 8: The SEM test and an energy dispersive spectroscopy (EDS) test are performed on Sb$_2$O$_3$@NiCo$(CO_3)_{0.5}$OH/carbon fiber cloth manufactured in comparative implementation 2. A result of the SEM test is illustrated in FIG. 18, where (a) is a low-magnification SEM pattern, and (b) is a high-magnification SEM pattern. A result of the EDS test is illustrated in FIG. 19.

As can be known from (a) and (b) in FIG. 18, the needle-shaped protrusions 311 are not damaged during reaction, and a difference between a size of a diameter of each needle-shaped protrusion 311 after reaction and that of each needle-shaped protrusion 311 before reaction is relatively small. As can be known from the EDS diagram as illustrated in FIG. 19, absence of element Sb in products further verifies correctness of the XRD detection result. A reason for the result may be that SbCl$_3$ undergoes alcoholysis, produces a precipitate in a solution, and could not react with a NiCo$(CO_3)_{0.5}$OH template grown on a carbon cloth. Furthermore, HCl generated during reaction reacts preferentially with the NiCo$(CO_3)_{0.5}$OH template, which further pushes alcoholysis equilibrium to the right and intensifies alcoholysis of SbCl$_3$ (reaction equation (4)), so that SbCl$_3$ has no chance to react with the NiCo$(CO_3)_{0.5}$OH template. Alternatively, SbCl$_3$ reacts with the NiCo$(CO_3)_{0.5}$OH template to form Sb$_2$O$_3$ (reaction equation (5)), but as reaction equation (4) proceeds, by-product HCl reacts with Sb$_2$O$_3$ (reaction equation (6)).

SbCl$_3$+C$_2$H$_5$OH→SbOCl↓+C$_2$H$_5$Cl+HCl     Reaction equation (4):

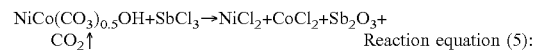

NiCo$(CO_3)_{0.5}$OH+SbCl$_3$→NiCl$_2$+CoCl$_2$+Sb$_2$O$_3$+CO$_2$↑     Reaction equation (5):

Figure 20:
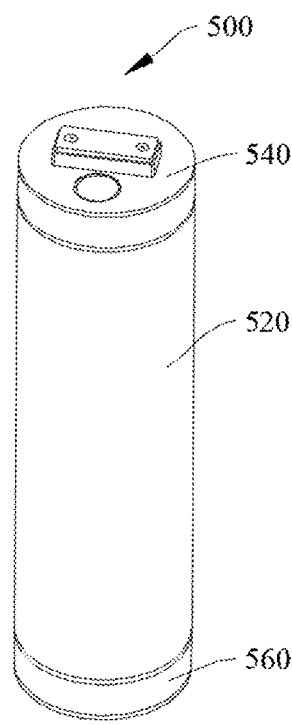
FIG. 20 is a schematic structural diagram illustrating a battery in an implementation of the disclosure.
Figure 21:
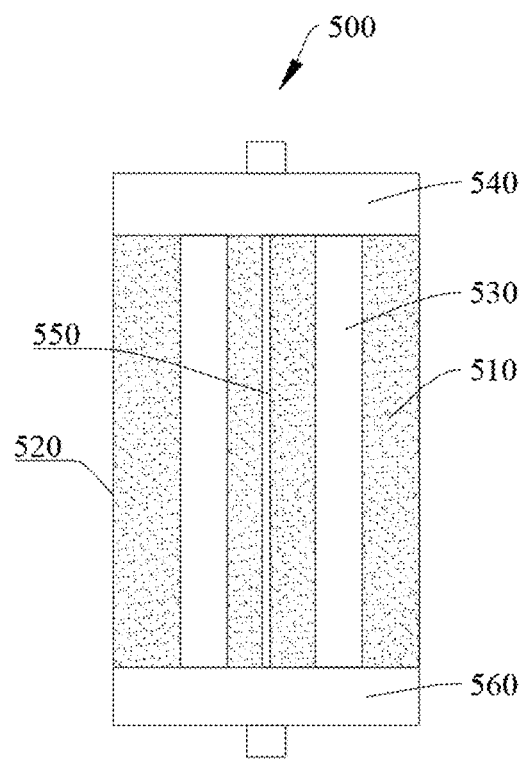
FIG. 21 is a schematic perspective view of a battery in an implementation of the disclosure.

HCl+Sb$_2$O$_3$→SbCl$_3$+H$_2$O     Reaction equation (6):

FIG. 20 is a schematic structural diagram illustrating a battery 500 in an implementation of the disclosure. FIG. 21 is a schematic perspective view of a battery 500 in an implementation of the disclosure. Referring to FIG. 20 and FIG. 21, a battery 500 is further provided in implementations of the disclosure. The battery 500 includes an electrolyte 510, a positive electrode sheet 530, a separator 550, and the negative electrode sheet 100 in implementations of the disclosure. The positive electrode sheet 530 is immersed in the electrolyte 510 and configured to be electrically coupled with a positive electrode of an electricity consumption device. The separator 550 is located at one side of the positive electrode sheet 530 and immersed in the electrolyte 510. The negative electrode sheet 100 is disposed at one side of the separator 550 away from the positive electrode sheet 530 and configured to be electrically coupled with a negative electrode of the electricity consumption device.

The battery 500 in implementations of the disclosure may be, but is not limited to, a lithium-ion secondary battery 500, a lithium-ion primary battery 500, a lithium-sulfur battery 500, a sodium lithium-ion battery 500, a sodium-ion battery 500, or a magnesium-ion battery 500.

Optionally, the positive electrode sheet 530 may be, but is not limited to, a lithium sheet.

Optionally, the electrolyte 510 may be, but is not limited to, at least one of lithium hexafluorophosphate (LiPF6), ethylene carbonate (EC), or dimethyl carbonate (DEC).

Optionally, the separator 550 may be, but is not limited to, at least one of polypropylene (PP) film or polyethylene (PE) film.

Optionally, the battery 500 further includes a housing 520, a negative electrode cover 540, and a positive electrode cover 560. The negative electrode cover 540 and the positive electrode cover 560 are disposed at two opposite ends of the battery 500. The housing 520, the negative electrode cover 540, and the positive electrode cover 560 cooperatively define a receiving cavity in which the electrolyte 510, the positive electrode sheet 530, the separator 550, and the negative electrode sheet 100 each are received. The positive electrode cover 560 is electrically coupled with the positive electrode sheet 530 and configured to electrically couple the positive electrode sheet 530 with the positive electrode of the electricity consumption device. The negative electrode cover 540 is electrically coupled with the negative electrode sheet 100 and configured to electrically couple the negative electrode sheet 100 with the negative electrode of the electricity consumption device.

It can be understood that, the battery 500 in the implementation is merely a form of the electricity consumption device to which the negative electrode sheet 100 is applied, and should not be understood as limitation to the battery 500 provided in the disclosure, nor should be understood as limitation to the negative electrode sheet 100 provided in various implementations of the disclosure.

The 500 in implementations of the disclosure will be further illustrated through specific implementations.

Implementation 2

The battery 500 of the disclosure is a lithium-ion rechargeable (LIR) 2025-type half cell 500, where the negative electrode sheet 100 manufactured in implementation 1 serves as the negative electrode sheet 100 and a lithium sheet serves as the positive electrode sheet 530. The battery 500 is assembled as follows.

1) The positive electrode sheet 530, the negative electrode sheet 100, etc. are placed into a glove box with an argon protective atmosphere and serve as operating electrodes. The metal lithium sheet serves as the positive electrode sheet 530, LiPF6/EC/DEC serves as the electrolyte 510, PP-ethylene serves as the separator 550, and thus the LIR2025-type button battery 500 is to be assembled.

2) The negative electrode cover 540, the negative electrode sheet 100, the electrolyte 510, the separator 550, the electrolyte 510, the positive electrode sheet 530, a gasket, and the positive electrode cover 560 are assembled sequentially to form the battery 500 and stored in a sealed bag with a seal.

3) The battery 500 assembled is taken out from the glove box, positive and negative shells are pressed and sealed with a sealing machine, to obtain the LIR2025-type button battery 500.

Figure 22:
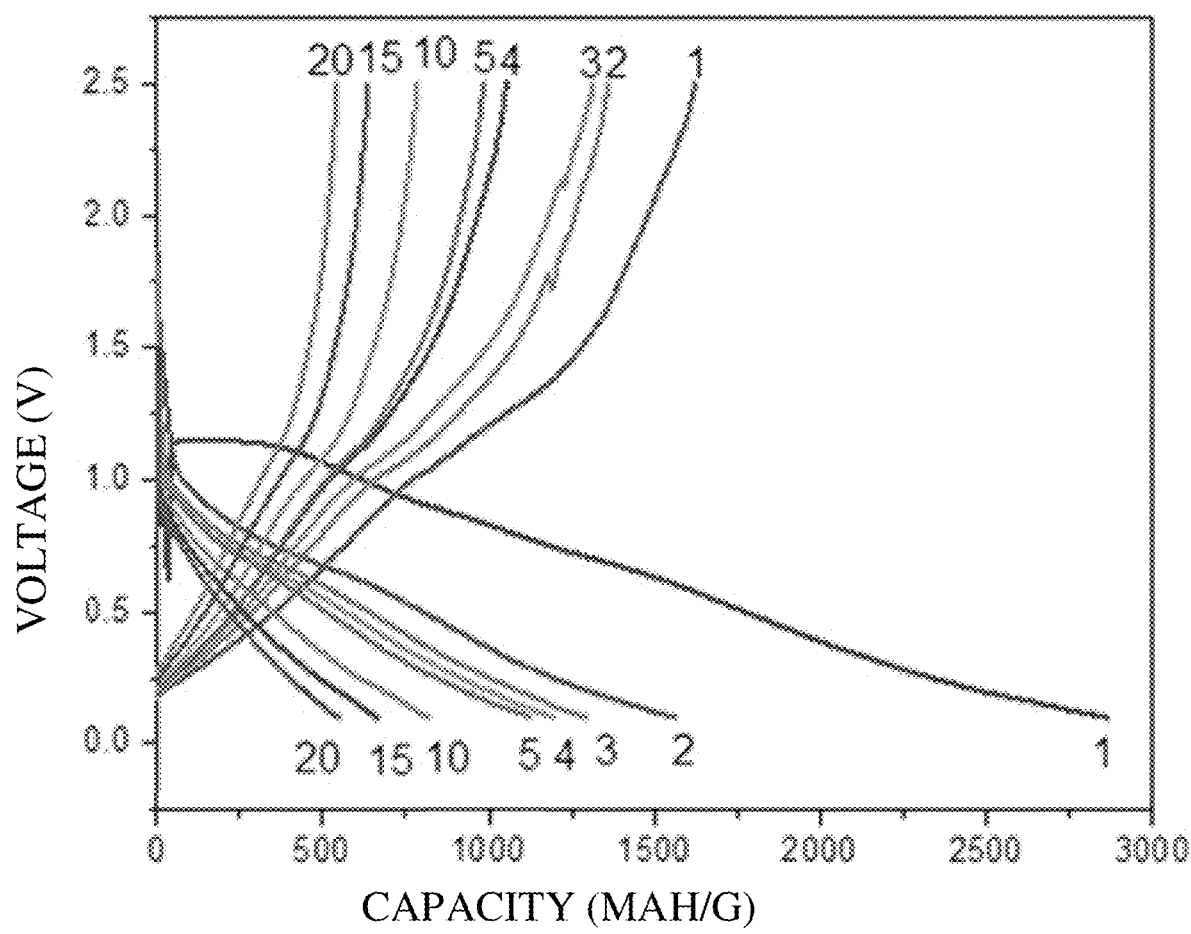
FIG. 22 is a charge-discharge test diagram of a battery in implementation 2 of the disclosure.

Test 9: A charge-discharge test diagram as illustrated in FIG. 22 is obtained by performing a charge-discharge cycle test on the battery 500 obtained in implementation 2, where numbers in FIG. 22 represent the number of times of charging and discharging. During test, a voltage is set to range from 0.1 V to 2.5 V, and the charge-discharge test is performed at 0.1 C multiplier. As can be seen from FIG. 22, the battery 500 obtained in implementation 2 has a first discharge capacity that is able to reach 2860.81 mAh/g, a first charge capacity of 1621.22 mAh/g, and a first reversible capacity of 55.7%. The first charge-discharge capacity of the battery 500 is much higher compared to data published by previous researchers, indicating that the negative electrode sheet 100 manufactured with the method of implementations has a good first charge-discharge capacity as well as a first reversible capacity.

Figure 23:
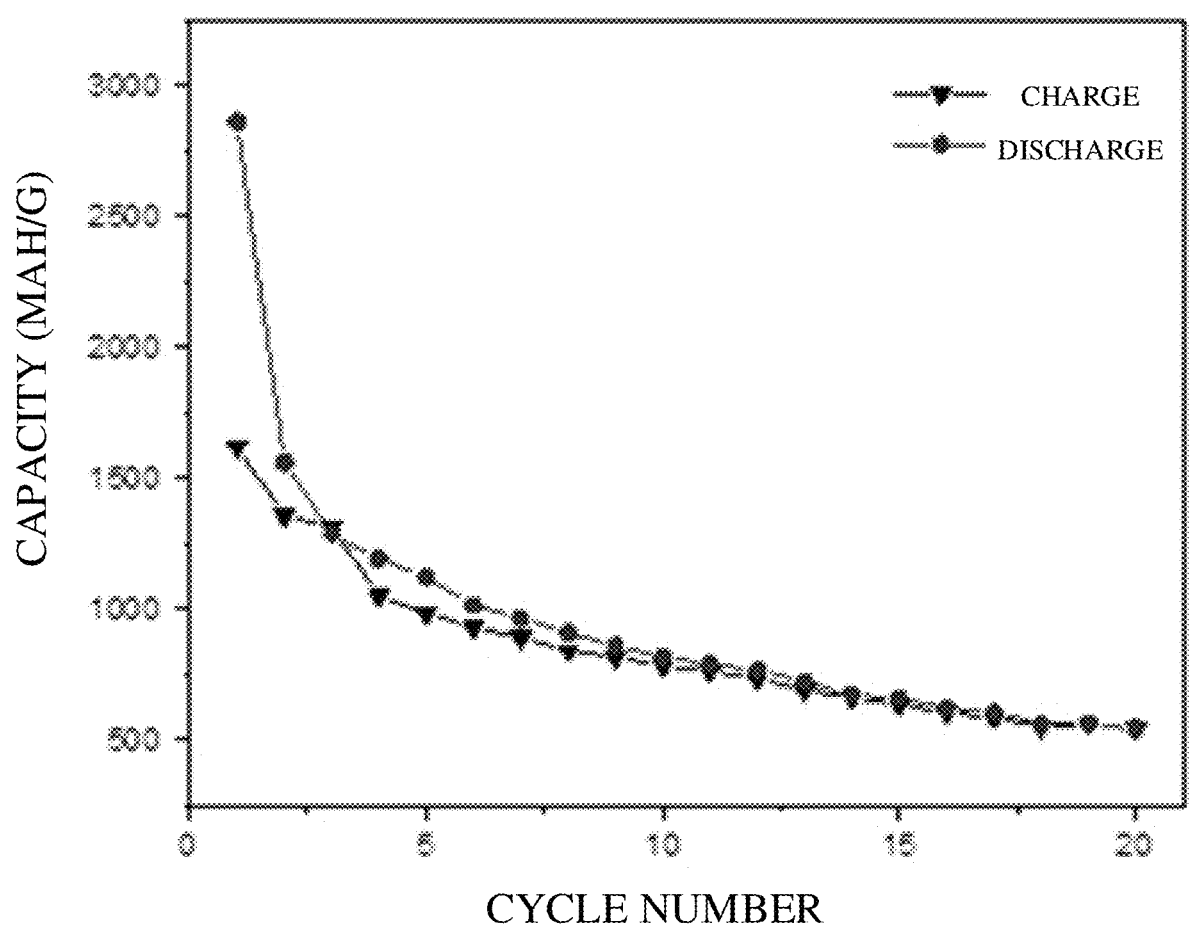
FIG. 23 is a charge-discharge capacity diagram of a battery in implementation 2 of the disclosure.

Test 10: FIG. 23 is a charge-discharge capacity diagram at a current density of 111 mAh/g (0.1 C multiplier).

As can be known from FIG. 23, a charge-discharge specific capacity of the battery 500 is continuously decreasing. The discharge capacity is larger until the 3rd cycle. There are mainly three reasons as follows. (1) After stencil etching, SbOCl is generated as a by-product, which may participate in discharge reaction, and the process of discharge reaction is irreversible. (2) Due to uneven etching of $Sb_2O_3$, a $NiCo(CO_3)_{0.5}OH$ support structure is in direct contact with the electrolyte 510 and undergoes oxidation reaction, resulting in a relatively high discharge specific capacity. (3) During discharging, lithium reacts directly with the electrolyte to form a passivation film (i.e., solid electrolyte interface (SEI) film), resulting in an increase in capacity. As can be known from the charge-discharge curve in FIG. 23, after 20 cycles, the charge capacity is decreased to 543.27 mAh/g, the discharge capacity is decreased to 552.24 mAh/g, and a coulomb efficiency is 98.4%. It indicates that an open structure of $PVP/Sb_2O_3@NiCo(CO_3)_{0.5}OH$/carbon fiber cloth can effectively mitigate volume change occurred during embedding/de-embedding of lithium ions and improve cycling stability of the material. As can be seen from the trend of the curve in FIG. 23, the charge-discharge specific capacity values are stabilized after the 18th cycle, and the reversible capacity remains around 550 mAh/g, which proves that the electrode material has a relatively high reversible capacity.

Figure 24:
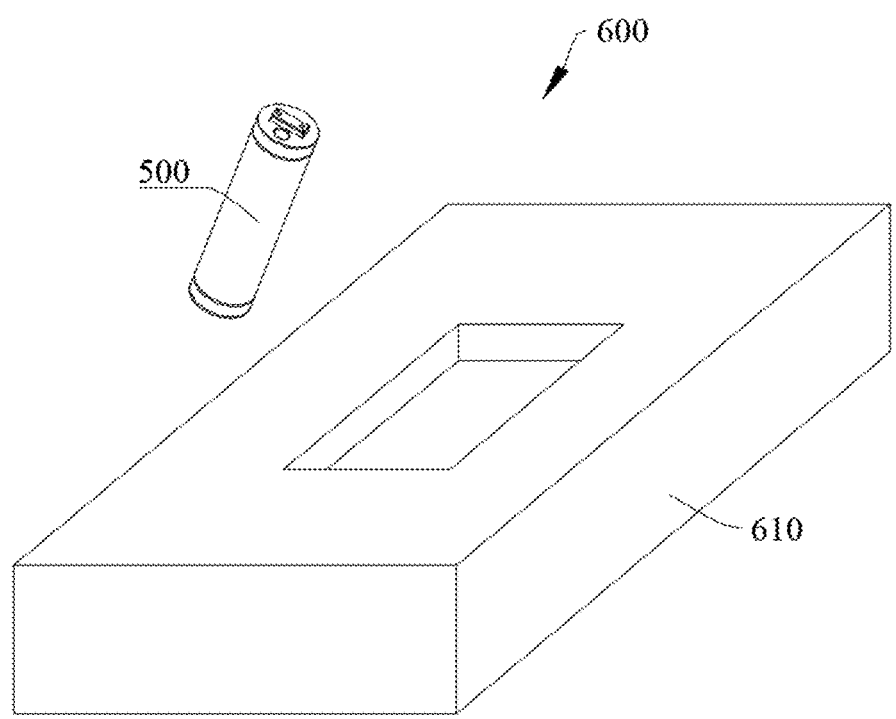
FIG. 24 is a schematic structural diagram illustrating an electricity consumption device in an implementation of the disclosure.

Referring to FIG. 24, an electricity consumption device 600 is further provided in implementations of the disclosure. The electricity consumption device 600 includes a body 610 of the electricity consumption device 600 and the battery 500 illustrated in implementations of the disclosure. The positive electrode sheet 530 of the battery 500 is configured to be electrically coupled with a positive electrode of the body 610 of the electricity consumption device 600. The negative electrode sheet 100 of the battery 500 is configured to be electrically coupled with a negative electrode of the body 610 of the electricity consumption device 600. The battery 500 is configured to supply power to the body 610 of the electricity consumption device 600.

The electricity consumption device 600 in implementations of the disclosure may be, but is not limited to, a cell phone, a tablet computer, a laptop computer, a desktop computer, a smart bracelet, a smart watch, an e-reader, a game console, a toy, and other electronic devices.

It can be understood that, the electricity consumption device 600 is merely a form of the electricity consumption device 600 to which the battery 500 is applied, and should not be understood as limitation to the electricity consumption device 600 provided in the disclosure, nor should be understood as limitation to the battery 500 provided in various implementations of the disclosure.

Reference terms "embodiments" and "implementations" referred to herein mean that particular features, structures, or characteristics described in conjunction with embodiments may be contained in at least one embodiment of the disclosure. The phrase appearing in various places in the specification does not necessarily refer to the same embodiment, a separate embodiment that is mutually exclusive with other embodiments, or an alternative embodiment. It is both explicitly and implicitly understood by those of ordinary skill in the art that the embodiments described in the specification may be combined with other embodiments. In addition, it can also be understood that the features, structures, or characteristics described in embodiments of the disclosure, without contradicting each other, can be combined at will to form yet another embodiment that does not depart from the spirit and scope of the technical solution of the disclosure.

Finally, it should be noted that the above implementations are used only to illustrate the technical solutions of the disclosure and not to limit it. Although the disclosure is described in detail with reference to the above optimal implementations, it should be understood by those of ordinary skill in the art that modifications or equivalent substitutions can be made to the technical solutions of the disclosure without departing from the spirit and scope of the technical solutions of the disclosure.

What is claimed is:

1. A negative electrode sheet, comprising:
   a conductive fiber cloth serving as a current collector of the negative electrode sheet;
   a support layer formed on a surface of the conductive fiber cloth and comprising a plurality of protruding units, wherein each of the plurality of protruding units comprises a plurality of needle-shaped protrusions, the plurality of needle-shaped protrusions of each protruding unit are arranged radially, and the support layer is made of basic cobalt nickel carbonate ($NiCo(CO_3)_{0.5}OH$); and
   an active material layer comprising a plurality of active portions, wherein each of the plurality of active portions is formed on a surface of one of the plurality of needle-shaped protrusions, different active portions are formed on surfaces of different needle-shaped protrusions, and a plurality of portions corresponding to each protruding unit are arranged radially;
   wherein each of the plurality of active portions comprises a plurality of active sub-layers, the plurality of active sub-layers of each active portion are arranged sequentially in an extension direction of a needle-shaped protrusion, each of the plurality of active sub-layers comprises a plurality of active pieces, the plurality of active pieces of each active sub-layer are arranged sequentially around a periphery of a needle-shaped protrusion, and each of the plurality of active portions is made of antimony trioxide ($Sb_2O_3$).

2. The negative electrode sheet of claim 1, wherein each of the plurality of needle-shaped protrusions has a maximum radial dimension ranging from 100 nm to 200 nm.

3. The negative electrode sheet of claim 1, wherein each of the plurality of needle-shaped protrusions has a length ranging from 1 μm to 5 μm.

4. The negative electrodeسheet of claim 1, wherein each of the plurality of active pieces has a thickness ranging from 500 nm to 900 nm.

5. The negative electrode sheet of claim 1, wherein the conductive fiber cloth comprises a carbon fiber cloth.

6. The negative electrode sheet of claim 1, further comprising:
   a cladding layer formed on a surface of the active material layer away from the conductive fiber cloth.

7. The negative electrode sheet of claim 6, wherein a material of the cladding layer is selected from a group consisting of polyvinylpyrrolidone, polyvinylidene fluoride, phenolic resin, epoxy resin, urea, asphalt, and coal tar.

8. A battery, comprising:
   an electrolyte;
   a positive electrode sheet immersed in the electrolyte;
   a separator located at one side of the positive electrode sheet and immersed in the electrolyte; and
   a negative electrode sheet disposed at one side of the separator away from the positive electrode sheet, wherein the negative electrode sheet comprises:
   a conductive fiber cloth serving as a current collector of the negative electrode sheet;
   a support layer formed on a surface of the conductive fiber cloth and comprising a plurality of protruding units, wherein each of the plurality of protruding units comprises a plurality of needle-shaped protrusions, the plurality of needle-shaped protrusions of each protruding unit are arranged radially, and the support layer is made of basic cobalt nickel carbonate ($NiCo(CO_3)_{0.5}OH$); and
   an active material layer comprising a plurality of active portions, wherein each of the plurality of active portions is formed on a surface of one of the plurality of needle-shaped protrusions, different active portions are formed on surfaces of different needle-shaped protrusions, and a plurality of portions corresponding to each protruding unit are arranged radially;
   wherein each of the plurality of active portions comprises a plurality of active sub-layers, the plurality of active sub-layers of each active portion are arranged sequentially in an extension direction of a needle-shaped protrusion, each of the plurality of active sub-layers comprises a plurality of active pieces, the plurality of active pieces of each active sub-layer are arranged sequentially around a periphery of a needle-shaped protrusion, and each of the plurality of active portions is made of antimony trioxide ($Sb_2O_3$).

9. The battery of claim 8, wherein each of the plurality of needle-shaped protrusions has a maximum radial dimension ranging from 100 nm to 200 nm.

10. The battery of claim 8, wherein each of the plurality of needle-shaped protrusions has a length ranging from 1 μm to 5 μm.

11. The battery of claim 8, wherein each of the plurality of active pieces has a thickness ranging from 500 nm to 900 nm.

12. The battery of claim 8, wherein the conductive fiber cloth comprises a carbon fiber cloth.

13. The battery of claim 8, wherein negative electrode sheet further comprises a cladding layer formed on a surface of the active material layer away from the conductive fiber cloth.

14. A manufacturing method of a negative electrode sheet, comprising:
   providing a conductive fiber cloth;
   forming a support layer on a surface of the conductive fiber cloth, wherein the support layer comprises a plurality of protruding units, each of the plurality of protruding units comprises a plurality of needle-shaped protrusions, the plurality of needle-shaped protrusions of each protruding unit are arranged radially, and the support layer is made of basic cobalt nickel carbonate (NiCo(CO$_3$)$_{0.5}$OH); and forming an active material layer on a surface of each of the plurality of needle-shaped protrusions, wherein the active material layer comprises a plurality of active portions, each of the plurality of active portions is formed on a surface of one of the plurality of needle-shaped protrusions, different active portions are formed on surfaces of different needle-shaped protrusions, and a plurality of portions corresponding to each protruding unit are arranged radially;

wherein each of the plurality of active portions comprises a plurality of active sub-layers, the plurality of active sub-layers of each active portion are arranged sequentially in an extension direction of a needle-shaped protrusion, each of the plurality of active sub-layers comprises a plurality of active pieces, the plurality of active pieces of each active sub-layer are arranged sequentially around a periphery of a needle-shaped protrusion, and each of the plurality of active portions is made of antimony trioxide (Sb$_2$O$_3$).

15. The manufacturing method of the negative electrode sheet of claim 14, wherein forming the active material layer on the surface of each of the plurality of needle-shaped protrusions comprises:

forming the active material layer on the surface of each of the plurality of needle-shaped protrusions by a reactant of an active material reacting with a substance on the surface of each of the plurality of needle-shaped protrusions in a vapor of the reactant of the active material.

16. The manufacturing method of the negative electrode sheet of claim 15, wherein forming the support layer on the surface of the conductive fiber cloth, wherein the support layer comprises the plurality of protruding units, each of the plurality of protruding units comprises the plurality of needle-shaped protrusions, and the plurality of needle-shaped protrusions of said each protruding unit are arranged radially, comprises:

providing a mixture liquid of NiCl$_2$·6H$_2$O, CoCl$_2$·6H$_2$O, and urea;

immersing the conductive fiber cloth in the mixture liquid; and forming the support layer on the surface of the conductive fiber cloth through reaction for a first duration under a first temperature, wherein the support layer comprises the plurality of protruding units, each of the plurality of protruding units comprises the plurality of needle-shaped protrusions, the plurality of needle-shaped protrusions of said each protruding unit are arranged radially, and each of the plurality of needle-shaped protrusions is made of NiCo(CO$_3$)$_{0.5}$OH.

17. The manufacturing method of the negative electrode sheet of claim 16, wherein a mole ratio of NiCl$_2$·6H$_2$O, the CoCl$_2$·6H$_2$O, and urea in the mixture liquid ranges from 1:2:4 to 1:2:8, the first temperature ranges from 80° C. to 200° C., and the first duration ranges from 5 h to 15 h.

18. The manufacturing method of the negative electrode sheet of claim 16, wherein forming the active material layer on the surface of each of the plurality of needle-shaped protrusions by the reactant of the active material reacting with the substance on the surface of each of the plurality of needle-shaped protrusions in the vapor of the reactant of the active material, comprises:

under a second temperature ranging from 100° C. to 400° C., in a vapor of antimony trichloride (SbCl$_3$), forming a Sb$_2$O$_3$ layer on the surface of each of the plurality of needle-shaped protrusions by SbCl$_3$ reacting with NiCo(CO$_3$)$_{0.5}$OH on the surface of each of the plurality of needle-shaped protrusions for a second duration, wherein the second duration ranges from 1 h to 5 h, the reactant of the active material is SbCl$_3$, and the active material layer is the Sb$_2$O$_3$ layer.

19. The manufacturing method of the negative electrode sheet of claim 18, wherein a weight ratio of NiCl$_2$·6H$_2$O, CoCl$_2$·6H$_2$O, and SbCl$_3$ ranges from 1:2:1.23 to 1:2:2.63.

20. The manufacturing method of the negative electrode sheet of claim 14, wherein after forming the active material layer on the surface of each of the plurality of needle-shaped protrusions, the method further comprises:

providing an aqueous solution of a raw material component of a cladding layer;

immersing the conductive fiber cloth with the support layer and the active material layer in the aqueous solution of the raw material component of the cladding layer; and forming the cladding layer on a surface of the active material layer away from the conductive fiber cloth by taking out the conductive fiber cloth for drying.

\* \* \* \* \*